United States Patent
Bando et al.

(10) Patent No.: US 8,005,602 B2
(45) Date of Patent: Aug. 23, 2011

(54) VEHICLE SPEED CONTROL DEVICE, METHOD OF DETERMINING TARGET SPEED BY USING THE DEVICE, AND PROGRAM EXECUTING THE METHOD

(75) Inventors: Mikio Bando, Kanagawa (JP); Takeshi Inoue, Ibaraki (JP); Koichiro Tanikoshi, Ibaraki (JP); Masao Sakata, Kanagawa (JP); Hiroshi Sakamoto, Ibaraki (JP); Masato Imai, Ibaraki (JP)

(73) Assignee: Hitachi, Ltd., Tokyo (JP)

(*) Notice: Subject to any disclaimer, the term of this patent is extended or adjusted under 35 U.S.C. 154(b) by 1162 days.

(21) Appl. No.: 11/655,196

(22) Filed: Jan. 19, 2007

(65) Prior Publication Data

US 2007/0192013 A1 Aug. 16, 2007

(30) Foreign Application Priority Data

Feb. 1, 2006 (JP) ................... 2006-024389

(51) Int. Cl.
*B60T 8/32* (2006.01)
*G01C 21/00* (2006.01)
(52) U.S. Cl. ............ 701/93; 701/70; 701/200; 701/208; 340/466; 340/467; 702/141; 702/142
(58) Field of Classification Search .................... 701/93, 701/200, 208, 70; 34/93, 200, 208; 340/446, 340/467; 702/141, 142
See application file for complete search history.

(56) References Cited

U.S. PATENT DOCUMENTS

| | | | | |
|---|---|---|---|---|
| 6,052,644 A * | 4/2000 | Murakami et al. | ............... | 701/93 |
| 6,129,025 A * | 10/2000 | Minakami et al. | ......... | 104/88.01 |
| 6,836,719 B2 * | 12/2004 | Andersson et al. | ............. | 701/93 |
| 6,885,395 B1 * | 4/2005 | Rabbani et al. | ............. | 348/231.1 |
| 7,044,248 B2 * | 5/2006 | Schmitt et al. | ................. | 180/170 |
| 7,131,507 B2 * | 11/2006 | Wenger et al. | .................. | 180/6.7 |
| 7,177,748 B2 * | 2/2007 | Irion et al. | ....................... | 701/93 |
| 7,296,646 B2 * | 11/2007 | Kawazoe et al. | ............. | 180/179 |
| 7,367,917 B2 * | 5/2008 | Sakamoto et al. | ................ | 477/5 |
| 7,445,578 B2 * | 11/2008 | Tabata et al. | ....................... | 477/3 |
| 7,460,945 B2 * | 12/2008 | Boecker et al. | .................. | 701/93 |
| 7,660,658 B2 * | 2/2010 | Sheynblat | ........................ | 701/93 |
| 7,917,269 B2 * | 3/2011 | Miyajima et al. | ............... | 701/70 |
| 2007/0192013 A1 * | 8/2007 | Bando et al. | .................... | 701/93 |

FOREIGN PATENT DOCUMENTS

| | | |
|---|---|---|
| JP | 8-268109 A | 10/1996 |
| JP | 10-100737 A | 4/1998 |
| JP | 2003-80970 A | 3/2003 |
| JP | 2005-178704 A | 7/2005 |
| JP | 2005-297621 A | 10/2005 |
| JP | 2005-297855 A | 10/2005 |

* cited by examiner

*Primary Examiner* — Thomas G Black
*Assistant Examiner* — Wae Louie
(74) *Attorney, Agent, or Firm* — Crowell & Moring LLP

(57) ABSTRACT

The present invention relates to a vehicle speed control device for controlling a speed of a vehicle. The vehicle speed control device includes a current location error estimation section for extracting area attribute information from the map information, for producing a location error probability distribution, a target speed calculation section for receiving the target speed correction instruction, for accessing preset data that shows an acceleration or a gradient of an acceleration which allows a driver not to feel uncomfortable, and for computing target speed values at nodes over the distance in such a way that the target speed values create a continuous curve, and a speed control section for sensing a speed of a vehicle, and for controlling a driving torque of the vehicle so that the sensed speed traces the continuous curve composed of the target speed values.

10 Claims, 15 Drawing Sheets

FIG. 1

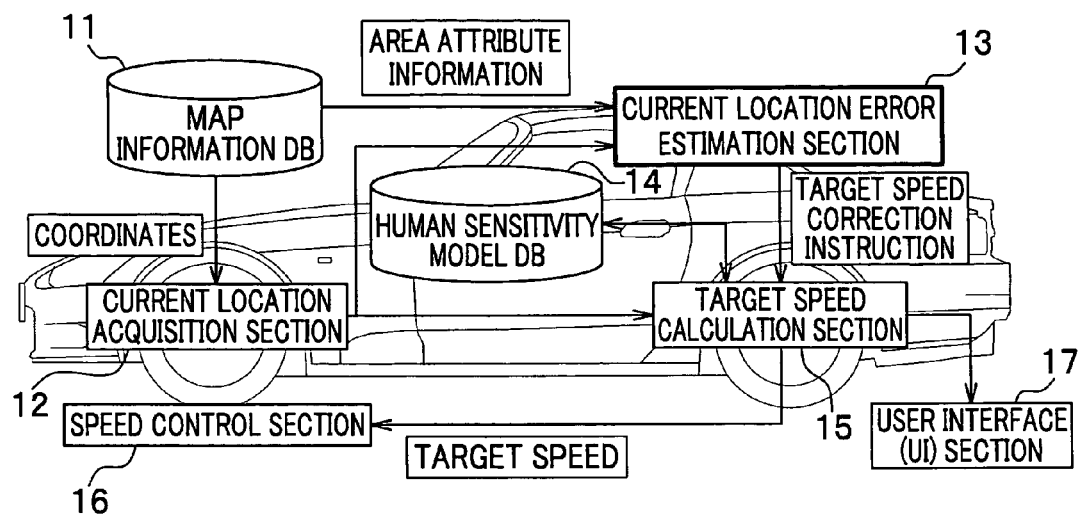

FIG. 2

11 MAP INFORMATION DB

| TOTAL NODE NUMBER |
| --- |
| NODE NUMBER |
| NODE X COORDINATE (LATITUDE) |
| NODE Y COORDINATE (LONGITUDE) |
| AREA ATTRIBUTE INFORMATION |
| ABSOLUTE COORDINATE FIXED MEASUREMENT POINT NODE X COORDINATE (LATITUDE) |
| ABSOLUTE COORDINATE FIXED MEASUREMENT POINT NODE Y COORDINATE (LONGITUDE) |
| LANDMARK LOCATION COORDINATE (STOP LINE, CROSSWALK) |
| NODE-TO-NODE LINK DISTANCE |
| NODE-TO-NODE LINK WIDTH (ROAD WIDTH) |
| NODE-TO-NODE LINK NUMBER (THE NUMBER OF LANES) |
| NODE-TO-NODE LINK INFORMATION (RIGHT, LEFT, STRAIGHT) |
| NODE-TO-NODE LINK SPEED (SPEED LIMIT) |

14 HUMAN SENSITIVITY MODEL DB

| SENSITIVITY COEFFICIENT TABLE |
| MAXIMUM ACCELERATION |
| MAXIMUM GRADIENT OF ACCELERATION |

| | L0 | L1 | L2 | L3 | ... |
|---|---|---|---|---|---|
| A | $\eta 1$ | $\eta 1$ | $\eta 2$ | $\eta 2$ | ... |
| B | $\eta 3$ | $\eta 3$ | $\eta 5$ | $\eta 5$ | ... |
| C | $\eta 2$ | $\eta 3$ | $\eta 4$ | $\eta 5$ | ... |
| D | $\eta 1$ | $\eta 1$ | $\eta 1$ | $\eta 1$ | ... |
| ⋮ | ⋮ | ⋮ | ⋮ | ⋮ | |

SENSITIVITY COEFFICIENT TABLE

FIG. 7

132 FIXED MEASUREMENT POINT ERROR PROBABILITY DISTRIBUTION DB

| TOTAL FIXED MEASUREMENT POINT NODE NUMBER |
| --- |
| FIXED SPOT NODE NUMBER |
| PROBABILITY DISTRIBUTION (NODE NUMBER X1) |
| ⋮ |
| PROBABILITY DISTRIBUTION (NODE NUMBER Xn) |

FIG. 8

135 ERROR PROBABILITY DISTRIBUTION INTERPOLATION PATTERN DB

| AREA TRANSITION INTERPOLATION PATTERN TABLE |
| --- |
| INTERPOLATION PATTERN I |
| ⋮ |
| INTERPOLATION PATTERN N |

AREA TRANSITION INTERPOLATION PATTERN TABLE

AREA TRANSITION INTERPOLATION PATTERN

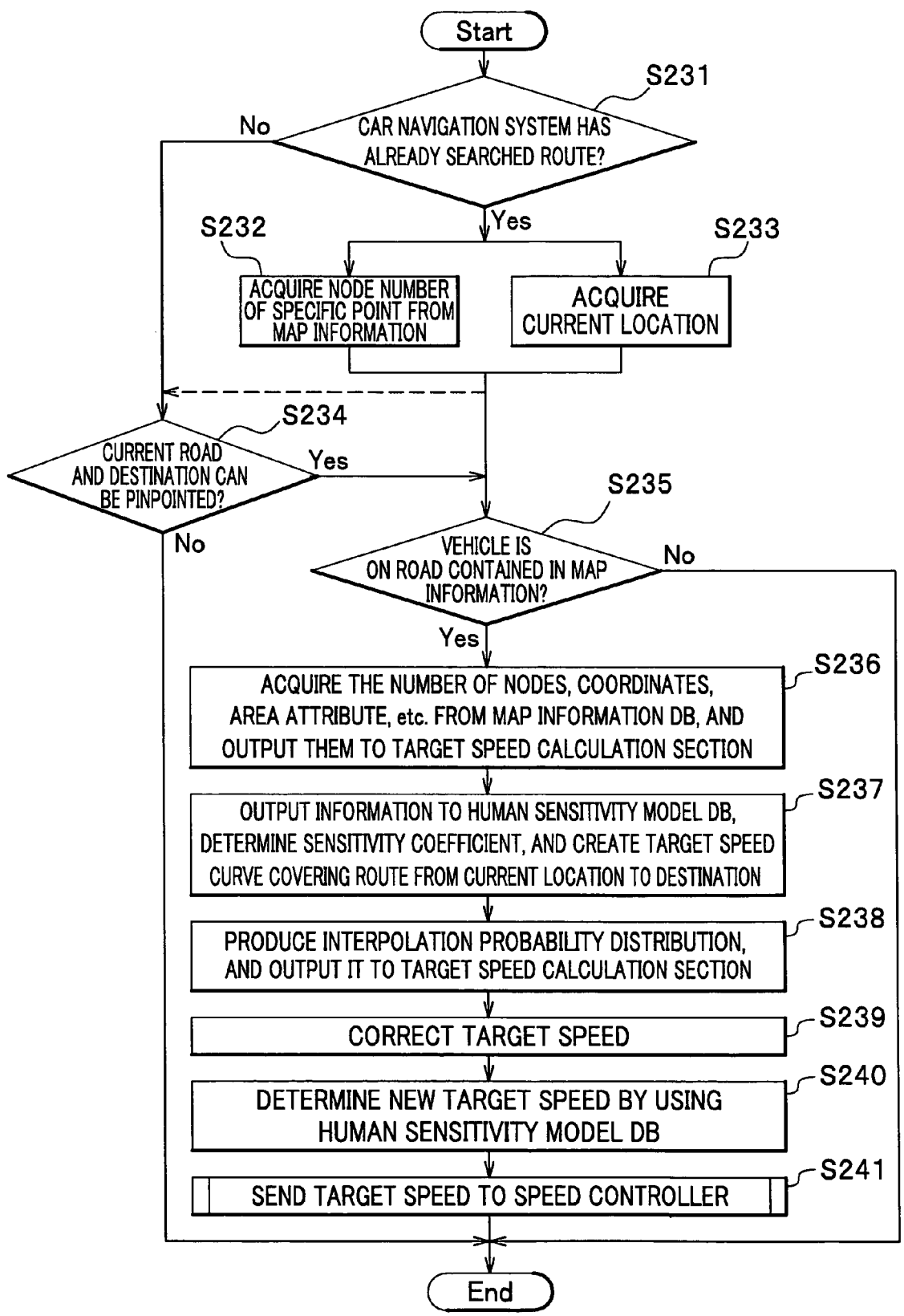

VEHICLE SPEED CONTROL DEVICE, METHOD OF DETERMINING TARGET SPEED BY USING THE DEVICE, AND PROGRAM EXECUTING THE METHOD

CROSS-REFERENCE TO RELATED APPLICATIONS

This application claims the benefit of Japanese Patent Application 2006-024389 filed on Feb. 1, 2006, the disclosure of which is incorporated herein by reference.

BACKGROUND OF THE INVENTION

1. Field of the Invention

The present invention relates to a vehicle speed control device that controls the speed of a vehicle within an object zone. Specifically, the present invention is directed to a vehicle speed control device which determines a target speed, based on map information and on a current location of a vehicle, and supplies the determined target speed to its speed controller. In addition, the present invention pertains to a method of setting a target speed of a vehicle by using the device and to program for executing the method.

2. Description of the Related Art

In order to control the speed of vehicles, many control devices (thereinafter called "vehicle speed control devices") have been proposed. These control devices are designed to control the speed of a vehicle within a predetermined zone by using positioning means such as map information or a global positioning system (GPS). To give some examples, Japanese Unexamined Patent Application Publication 2005-178704 discloses a cruise-assist system, which is adapted to determine the target speed of a vehicle, based on the conditions of a route and by using a car navigation system (see paragraphs 0012 to 0018 and FIG. 3). Furthermore, Japanese Unexamined Patent Application Publication 2003-80970 discloses a vehicle speed control device, which is configured to determine the upper and lower limits of target speed of a vehicle, based on a speed desired by the driver and by using a GPS. Subsequently, this device executes an automatic cruising control (ACC), based on the predetermined upper and lower limits (see paragraphs 0004 to 0006 and FIG. 1).

In such control, it is preferable that a control device does not make a driver feel uncomfortable.

Japanese Unexamined Patent Application Publication 8-268109 discloses a vehicle speed control device, which is designed to keep measuring a rate at which the driver changes the speed of a vehicle. Then, the device adjusts the speed in compliance with the measured rate (see paragraphs 0006 to 0013 and FIG. 1). Moreover, Japanese Unexamined Patent Application Publication 10-100737 discloses a vehicle speed control device, which is adapted to determine a time period required for acceleration or deceleration by using infrastructure facilities such as beacons and based on a target speed at a predetermined point. Subsequently, the device changes the acceleration or deceleration continuously, thereby changing the speed of a vehicle smoothly (see paragraphs 0005 to 0008 and FIG. 1).

Japanese Unexamined Patent Application Publication 2005-297855 discloses a deceleration control device, which is configured to determine the target deceleration of a vehicle, based on an input travel orientation and driver's technique. Then, the device controls the speed of the vehicle, based on the predetermined deceleration (see paragraphs 0008 to 0011 and FIG. 1). In addition, Japanese Unexamined Patent Application Publication 2005-297621 discloses an automatic control device, which is adapted to automatically control the speed of a vehicle without making a driver feel uncomfortable. This device memorizes and learns the acceleration or deceleration patterns for each route and, then controls the speed of a vehicle based on the learned patterns when the vehicle runs on the same route (see paragraphs 007 to 0032 and FIG. 10).

In controlling the speed of a vehicle by using map information and a positioning means, it is difficult for a control device to determine the coordinates of a target point precisely. This is because the data acquired from a positioning means contains a considerable error.

Furthermore, after acquiring data from a positioning means, the device must correct the location coordinates of the vehicle by mapping the acquired data on the running route of the map information. In this case, if the acquired data is quite different from the current location coordinates, the current location may jump on the map information. Accordingly, the vehicle may pass through a target point, or changes its speed rapidly. This gives the driver an inconvenience or makes him or her feel uncomfortable.

Taking the above disadvantage into account, the present invention has been conceived. An object of the present invention is to provide a vehicle speed control device, which presents a driver with comfortable drive without causing the rapid speed change or by preventing a vehicle from unconsciously passing through a target point. Specifically, the vehicle speed control device is adapted to predict the rapid change in a target speed of a vehicle, and then, to change the speed of the vehicle more gradually than the target speed. An additional object of the present invention is to provide a method of setting a target speed of a vehicle by using the above device. Another object of the present invention is to provide a program for executing the above method.

SUMMARY OF THE INVENTION

According to an aspect of the present invention, there is provided, a vehicle speed control device including a speed control section, the vehicle speed control device for controlling a speed of a vehicle within a control-executed zone by computing a target speed of the vehicle based on map information and a current location of the vehicle and by supplying the target speed to the speed control section, the vehicle speed control device including:

a1) a current location error estimation section for extracting area attribute information from the map information, for producing a location error probability distribution of the vehicle, based on the area attribute information, and for outputting the produced location error probability distribution as a target speed correction instruction, wherein the area attribute information indicates an attribute of the current location or of the control-executed zone;

a2) a target speed calculation section for receiving the target speed correction instruction, for accessing preset data that shows an acceleration or a gradient of an acceleration which allows a driver not to feel uncomfortable and that depends on the location error probability distribution and a distance between a destination and a speed change start point of the target speed, and for computing target speed values at nodes over the distance in such a way that the target speed values create a continuous curve; and a3) a speed control section for sensing a speed of a vehicle, and for controlling a driving torque of the vehicle so that the sensed speed traces the continuous curve composed of the target speed values.

According to another aspect of the present invention, there is provided, a method of setting a target speed by using a vehicle speed control device, the vehicle speed control device including a memory unit and a computing unit, for controlling a speed of a vehicle within a control-executed zone by computing a target speed of the vehicle based on map information and a current location of the vehicle and by supplying the target speed to a speed control section, the method including:

b1) producing a location error probability distribution of the vehicle by using the computing unit, based on area attribute information contained in the map information, wherein the area attribute information indicates an attribute of the current location or of the control-executed zone;

b2) outputting the location error probability distribution, b3) reading preset data that shows an acceleration or a gradient of an acceleration which allows a driver not to feel uncomfortable and that depends on the location error probability distribution and a distance between a destination and a speed change start point of the target speed; and b4) computing target speed values at nodes over the distance by using the computing unit in such a way that the target speed values create a continuous curve.

With the above device and method, the rapid change in a target speed of a vehicle can be predicted, and the speed of the vehicle is able to be changed more gradually than the target speed. Consequently, it is possible to present a driver with comfortable drive without causing the rapid speed change or by preventing a vehicle from unconsciously passing through a target point.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein:

FIG. 1 is a block diagram depicting an internal structure of a vehicle speed control device according to an embodiment of the present invention;

FIG. 2 is a view depicting a data structure of a map information DB in the vehicle speed control device;

FIG. 7 is a view depicting a data structure of a fixed measurement point error probability distribution DB in the vehicle speed control device;

FIG. 8 is a view depicting a data structure of an error probability distribution interpolation pattern DB in the vehicle speed control device;

FIG. 23 is a flowchart showing a process for computing a target speed to a destination in the vehicle speed control device.

DETAILED DESCRIPTION OF THE EXEMPLARY EMBODIMENTS OF THE INVENTION

Figures 3, 4:
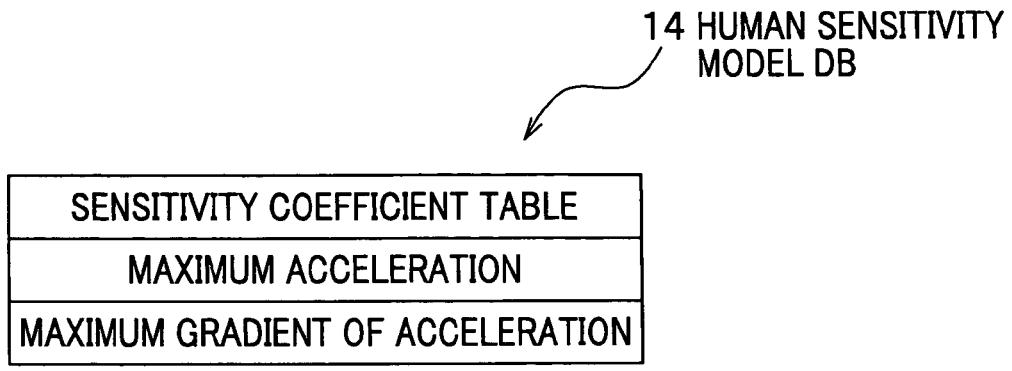
FIG. 3 is a view depicting a data structure of a human sensitivity model DB in the vehicle speed control device.
FIG. 4 is a view depicting a data structure of a sensitivity coefficient table in the vehicle speed control device.

FIG. 1 shows a vehicle speed control device according to an embodiment of the present invention. This vehicle speed control device may be implemented with a car navigation system or a dedicated terminal device. Referring to this figure, the vehicle speed control device includes a map information DB 11, a current location acquisition section 12, a current location error estimation section 13, a human sensitivity model DB 14, a target speed calculation section 15, a speed control section 16, and a user interface (UI) section 17. Note that "DB" stands for a database.

The map information DB 11 has a data structure as shown in FIG. 2. Referring to this figure, "total node number" means the total number of nodes that have coordinates in a map. These nodes represent the shape of a road, and each of the nodes has its node number. "Node X coordinate" and "node Y coordinate" show coordinates at each node and, specifically indicate the latitude and longitude, respectively.

"Area attribute information" is data to be used by the current location error estimation section 13, and it contains information on an attribute of the current location of a vehicle or on an attribute of a control-executed zone. Furthermore, the area attribute information also contains node numbers on the border of cities. The control-executed zone means a zone which is to be defined in long term before a route is set. In addition, the control-executed zone is identified by the node numbers contained in the area attribute information. To demonstrate, the area attribute information is a pattern produced by averaging the probability of occurrence of an error at fixed measure points within a controlled area. The produced patterns are classified into multiple groups A, B, C, etc. (described in detail later). An individual area is defined by borders between cities, and the pieces of the area attribute information within a controlled area are identical.

"Absolute coordinate fixed measurement point node" is a node point where an absolute location coordinate of a vehicle can be acquired by beacons on a road or a camera(s) in a vehicle. "Absolute coordinate fixed measurement point node X coordinate" indicates the longitude at the absolute coordinate fixed measurement point node, and "absolute coordinate fixed measurement point node Y coordinate" indicates the latitude at the point node. "Landmark location coordinate" shows a coordinate of a landmark such as a stop line or crosswalk that is used to be compared to an absolute coordinate.

"Node-to-node link distance" indicates a distance between two adjacent nodes by meters. In addition, "node-to-node link width" indicates a width of a road by meters. "Node-to-node link number" indicates the number of traffic lines. In addition, the node-to-node link number contains nodes, and these nodes are linked to each other. The same number is allocated to the nodes on a single traffic lane, thus making it possible to identify which a lane is separated or which lanes are merged. "Node-to-node link information" is a node, to which node-to-node link number is allocated, contains any one of right-turn-only, lift-turn-only, straight-only, right-turn or straight, and left-turn or straight. "Node-to-node link speed" indicates a speed limit on a link between two adjacent nodes.

The current location acquisition section 12 pinpoints the current location coordinate of a vehicle by means of the global positioning system (GPS), beacons, or the dead reckoning navigation method. Specifically, the global positioning system (GPS) is adapted to obtain the latitude and longitude from a satellite. A beacon is configured to continuously emit electric wave showing its current location. The dead reckoning navigation method is to use the combination of a map and a GPS.

The dead reckoning navigation method is disclosed by a reference 1. This method is to acquire a relative location by means of a speed pulse and a gyro sensor, and then, to pinpoint an absolute coordinate by mapping the relative location.

(Reference 1)

Arai and Washio "Navigation system", Sankaido publishing Co., Ltd, July 2001, ISBN: 4381087984.

The current location acquisition section 12 sends the acquired current location coordinates to the target speed calculation section 15 and to the current location error estimation section 13. The current location error estimation section 13 receives the current location coordinates and, then acquires area attribute information on a control-executed zone from the map information DB 11, based on the received the current location coordinates.

The human sensitivity model DB 14 has a data structure as shown in FIG. 3. Specifically, this model DB 14 contains data composed of a sensitivity coefficient table, maximum acceleration, and maximum gradient of acceleration.

The sensitivity coefficient table may have a matrix table, as shown in FIG. 4. Its columns represent the groups A to D, . . . of the area attribute information in the map information DB 11. Its rows represent the sensitivity coefficient $\pi i$ (i=1, 2, . . . ) that can be selected based on a distance (L0 to L3, . . . ) between a current location and a destination.

The sensitivity coefficient $\pi i$ (i=1, 2, . . . ) may have dimensionless value expressed by the following equation.

Sensitivity coefficient=Function (distance between current location and destination, speed, acceleration, gradient of acceleration) (1)

It can be considered that humans do not feel uncomfortable as long as the sensitivity coefficient is lower than the value $\pi i$ (i=1, 2, . . . ).

The sensitivity coefficient table is a matrix table of sensitivity coefficients $\pi$ determined beforehand by the equation (1). The distance (L0 to L3 . . . ) between a destination and a current location is classified under groups L0 [m], L1 [m], . . . according to preset values. The maximum acceleration and the maximum gradient of acceleration are a respective maximum threshold value at which humans do not feel uncomfortable. Generally, humans feel uncomfortable due to the rapid change in the acceleration. In order to relate the maximum acceleration to the maximum gradient of acceleration or to the sensitivity coefficient $\pi I$ (i=1, 2, . . . ), a preset value obtained by experiments can be employed.

The target speed calculation section 15 determines a target speed of a vehicle on each of coordinates from a current location to a destination. The speed of the vehicle on each coordinate is determined so that the acceleration and the gradient of the acceleration do not exceed the maximum acceleration and maximum gradient in the human sensitivity model DB. Moreover, it is preferable that the change in the speed must draw a continuous smooth curve. Note that a method of changing the speed of a vehicle continuously is known, and its example is disclosed by Japanese Unexamined Patent Application Publication 10-100737. The current location error estimation section 13 sends a target speed correction instruction to the target speed calculation section 15. In response to this instruction, the target speed calculation section 15 calculates a target speed.

The internal structure of the target speed calculation section 15 and its calculation algorithm will be described later.

The speed control section 16 senses the current speed of a vehicle, and adjusts the sensed current speed to a target value.

Figure 5:
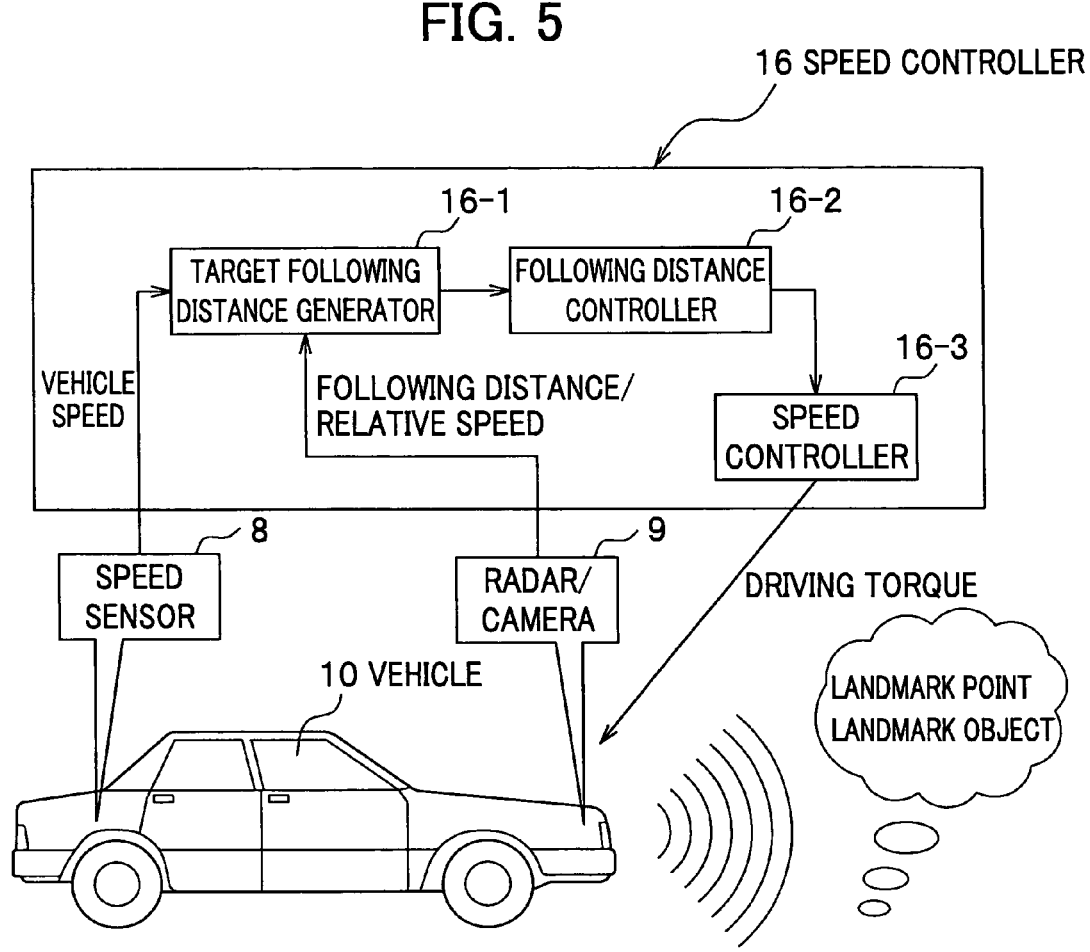
FIG. 5 is a block diagram depicting an internal structure of a speed controller in the vehicle speed control device.

FIG. 5 shows a vehicle control system. One example of a vehicle control system is an ACC system, and this system is disclosed by a reference 2.

(Reference 2)

Aanai "vehicle", Corona publishing Co., Ltd, Dec. 12, 2003, ISBN: 4339033634

Thereinafter, a description will be given on the condition that the speed control section 16 functions as a "speed control section 16" in the ACC system of FIG. 5.

As shown in FIG. 5, the speed control section 16 includes a target following distance generator 16-1, a following distance controller 16-2, and a speed control section 16-3.

The target following distance generator 16-1 detects a distance between a vehicle 10 and another vehicle ahead, and their relative speed, based on data from a speed sensor 8 and a radar camera 9. Then, the generator 16-1 calculates a target distance between the vehicle 10 and another vehicle ahead.

The following distance controller 16-2 determines a target speed for maintaining the target distance. The speed control section 16-3 adjusts the speed of a vehicle to the determined target speed. Note that the speed control section 16-3 adjusts the speed by changing the driving torque.

The speed control section 16 can control the speed of the vehicle, as long as a distance between a current location and a destination falls within a range covered by a radar camera 9, etc. This range is accuracy requirement of the speed control section 16. If the speed control section 16 has multiple devices for sending speed instructions, then one of the instructions are selected in accordance with a priority order that has been preset.

Figure 6:
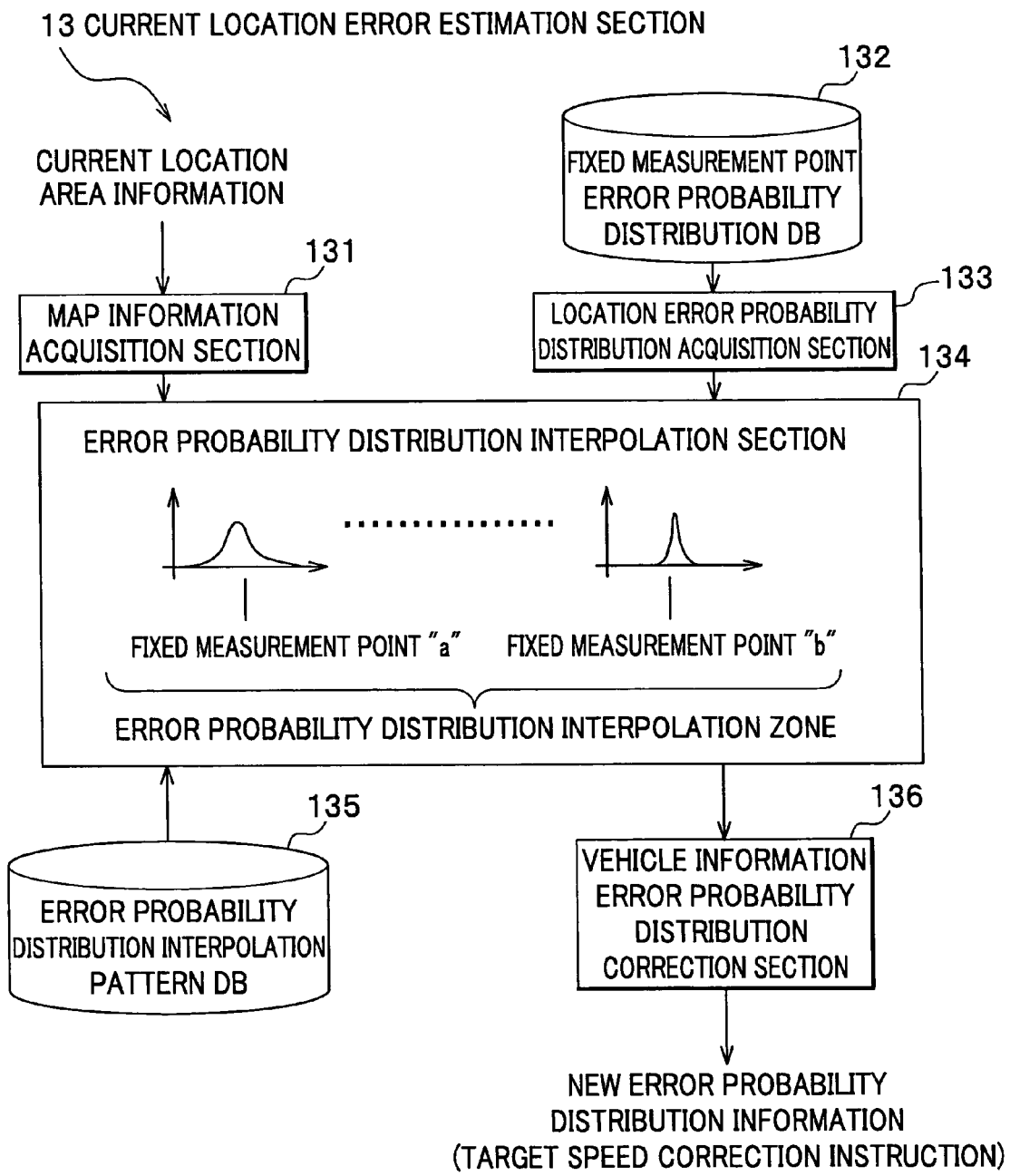
FIG. 6 is a block diagram depicting an internal structure of a current location error estimation section in the vehicle speed control device.

The function of internal structure of the current location error estimation section 13 is shown by a block diagram of FIG. 6. Its hardware is composed of a memory and a computer. Its structural function includes a fixed measurement point error probability distribution DB 132, a location error probability distribution acquisition section 133, an error probability distribution interpolation section 134, an error probability distribution interpolation pattern DB 135, and a vehicle information error probability distribution correction section 136.

Referring to FIG. 6, the map information acquisition section 131 acquires current location area information from the map information DB 11. The current location area information contains the area attribute information and information on fixed measurement points around a current location.

In this embodiment, the current location area information contains at least two fixed measurement point nodes and all nodes between the fixed measurement nodes.

The fixed measurement point error probability distribution DB 132 has a data structure as shown in FIG. 7. This data base memorizes multiple patterns of location error probability distribution between adjacent fixed measurement point nodes.

In FIG. 7, "total fixed measurement point node number" indicates the total number of absolute coordinate fixed measurement points, and "fixed spot node number" indicates the node number of the absolute coordinate fixed measurement point. "Probability distribution" represents location error probability distribution in the order of the fixed spot node numbers, and is composed of a sequence showing error and probability distribution.

Figure 9:
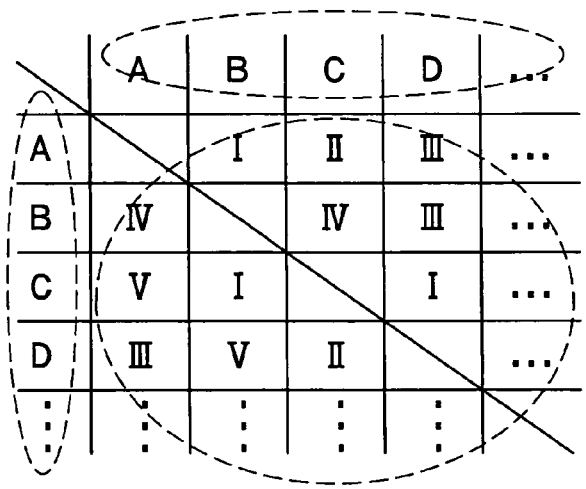
FIG. 9 is a view depicting a data structure of an error probability distribution interpolation pattern DB in the vehicle speed control device.

FIG. 8 shows the data structure of the error probability distribution interpolation pattern DB 135. An area transition interpolation pattern table of this figure has a table structure of FIG. 9. Its columns indicate area attribute (ranks A to D), and its rows indicate the area attribute of a next node (ranks A to D). Patterns I to IV are used to interpolate the error probability distribution, when a vehicle moves from a certain controlled area to another one. If their area attributes are identical, then the pattern is not generated.

Figure 10:
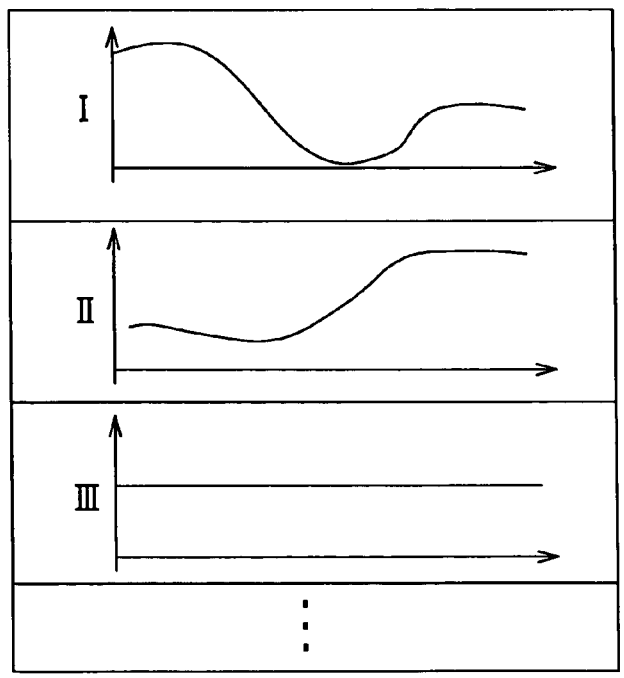
FIG. 10 is a view depicting an example of area transit interpolation patterns produced in the vehicle speed control device.

The interpolation patterns are shown by curve lines in FIG. 10. Each of the curve lines has a number such as pattern I, II or III. The horizontal axis of each interpolation pattern curve line represents the magnitude of the error in the probability distribution. Its lateral axis represents an interpolation coefficient. These pieces of data are stored in the form of number sequences. Multiple curved lines are prepared, and one of them is selected depending on a case.

The error probability distribution interpolation section 134 computes the interpolation of the probability distribution at a certain node. Note that this computation is performed based on the following information:

the area attribute information at the current location that is acquired from the map information acquisition section 131;
the fixed measurement points around the current location;
the information in the fixed measurement point error probability distribution DB 132 which is acquired through the location error probability distribution acquisition section 133; and
the interpolation pattern of the location error in the probability distribution that is acquired from the error probability distribution interpolation pattern DB 135.

Figure 11:
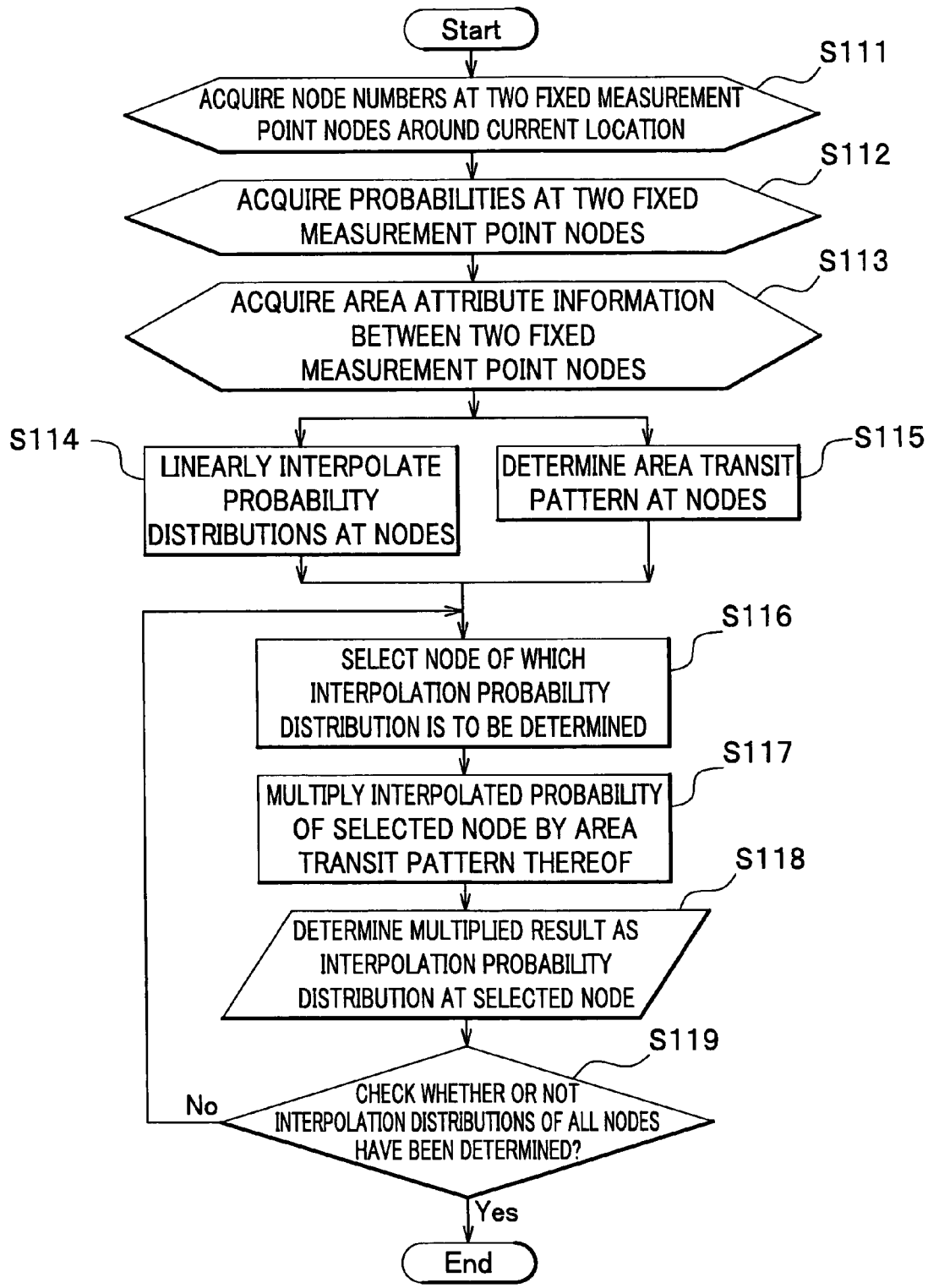
FIG. 11 is a flowchart showing a process for producing an interpolate probability distribution in the vehicle speed control device.

FIG. 11 shows a flowchart of algorithm for generating the interpolation probability distribution pattern.

With reference to this flowchart, an operation of the current location error estimation section 13 will be described.

The current location error estimation section 13 receives the area attribute information of a current location through the map information acquisition section 131. Subsequently, the section 13 extracts the node numbers of two fixed measurement point nodes around the current location of a vehicle (S111). The location error probability distribution acquisition section 133 accesses the fixed measurement point error probability distribution DB 132, and then, acquires the probability distributions at the two fixed measurement point nodes therefrom (S112) The map information acquisition section 131 acquires area attribute information between the two fixed measurement point nodes (S113).

The section 134 linearly interpolates the probability distributions at the fixed measurement point nodes (S114). A parameter for linear interpolation is a link distance between the fixed measurement point nodes. Furthermore, the error probability distribution interpolation section 134 selects the area transition pattern from the area transition interpolation pattern table in the error probability distribution interpolation pattern DB 135, based on the area attribute information at the nodes (S115).

The error probability distribution interpolation section 134 selects a node of which an interpolation probability distribution is to be determined (S116). Next, the section 134 multiplies the interpolated probability distribution of the selected node by the area transition pattern thereof (S117), and then, determines the multiplied result as an interpolation probability distribution at the selected node (S118).

The error probability distribution interpolation section 134 determines whether or not the interpolation probability distribution are acquired at all the nodes within a control-executed zone area where the current location is positioned (S119). If the interpolation probability distributions are not yet acquired at all the nodes ("No" at S119), then the process returns to the step S116. Otherwise ("Yes" at S119), the current location error estimation section 13 terminates the process. The determined interpolation probability distributions are delivered to the vehicle information error probability distribution correction section 136.

Referring to FIG. 6 again, the vehicle information error probability distribution correction section 136 corrects the received interpolation probability distributions, based on the error probability of the vehicle sensor (speed sensor 8 and radar camera 9) and the shape of a route from the current location to a destination. Note that the error of the vehicle sensor depends only on the shape of the route.

Assuming that the respective vehicle sensors are made sensors 1, 2, . . . n, the probability distribution of the error generated by the vehicle sensors between nodes can be expressed by an equation (2).

$$\text{Error probability distribution of vehicle sensor between nodes} = \text{constant} \times \sum_{k=1}^{n} (\text{error probability distribution of sensor } k) \qquad (2)$$

The vehicle information error probability distribution correction section 136 multiplies the error probability distribution of the vehicle sensor by the interpolation probability distributions at the nodes that are outputted from the error probability distribution interpolation section 134. Following this, the section 136 memorizes the multiplied result as new error probability distribution information. Moreover, the new error probability distribution is outputted to the target speed calculation section 15 as a target speed correction instruction.

In this embodiment, the interpolation probability distribution between the adjacent nodes is identical to that of the former nodes.

Figure 12:
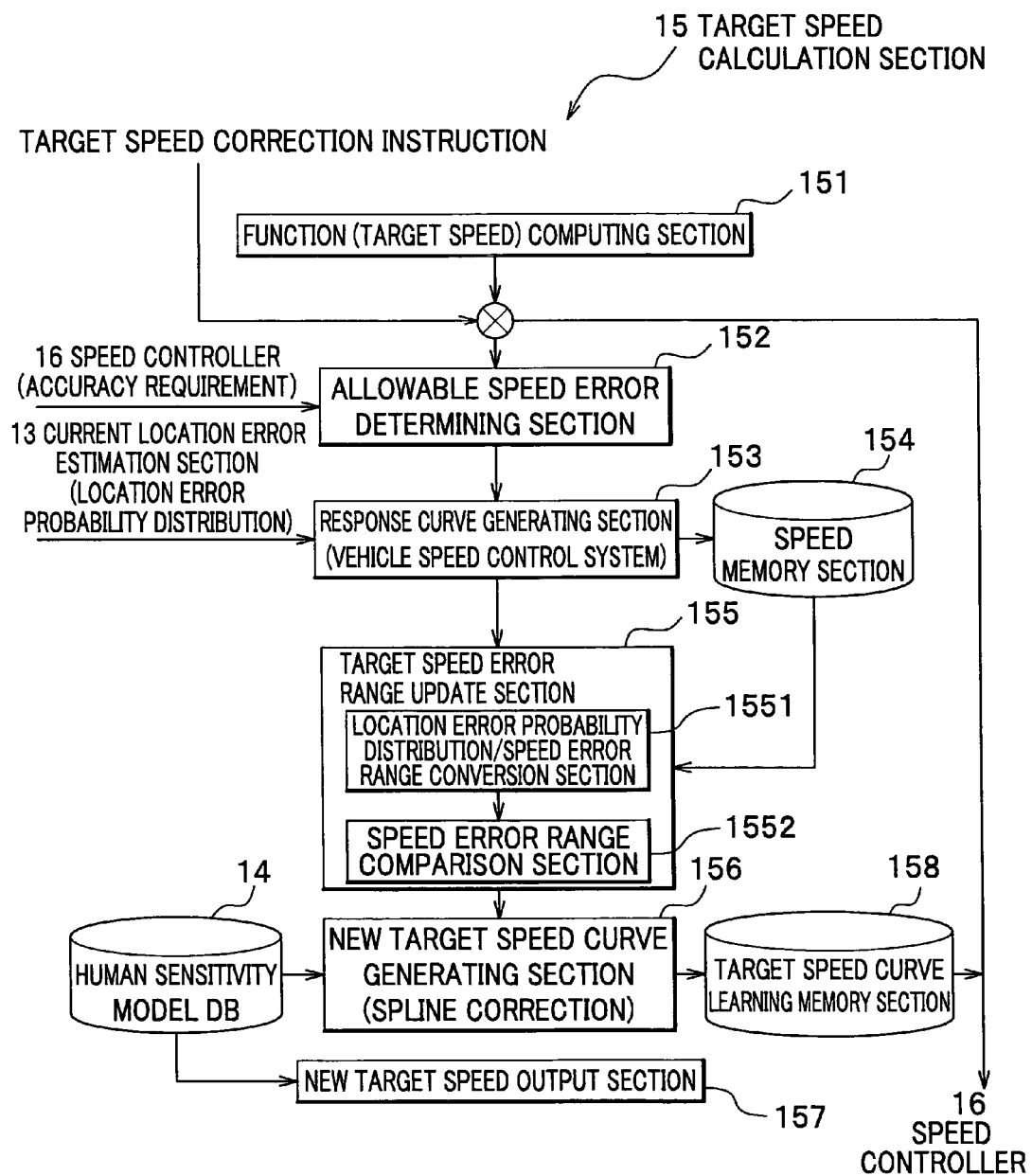
FIG. 12 is a block diagram depicting an internal structure of a target speed calculation section in the vehicle speed control device.

FIG. 12 shows a block diagram of function of internal structure of the target speed calculation section 15. Its hardware is composed of a memory and computer.

The function of the target speed calculation section 15 includes a function computing section 151, an allowable speed error determining section 152, a response curve generating section 153, a speed memory section 154, a target speed error range update section 155, a new target speed curve generating section 156, a new target speed output section 157, and a target speed curve learning memory section 158.

The function computing section 151 computes a target speed at each node between a current location and a destination on the condition that any positional error is ignored. Subsequently, the section 151 creates a target speed curve. If receiving the target speed correction instruction, then the function computing section 151 outputs it to the allowable speed error determining section 152. Otherwise, it is outputted to the speed control section 16.

The allowable speed error determining section 152 determines a target speed allowing for an error, based on the difference between the target speed at a destination and a speed value on a target speed curve in accordance with accuracy requirement of the speed control section 16.

The response curve generating section 153 receives the location error probability distribution at each node, and then, creates a response target speed curve of a predetermined range over a route from a speed change start point to a destination. Furthermore, the response curve generating section 153 outputs the created curve to both the speed memory section 154 and the target speed error range update section 155 as the target speed error range.

The target speed error range update section 155 includes a location error probability distribution/speed error range conversion section 1551 and a speed error range comparison section 1552. The location error probability distribution/speed error range conversion section 1551 converts the location error probability distribution into the speed error range containing an error on the near and far sides with respect to the current location, based on a predetermined equation. The speed error range comparison section 1552 determines whether or not the target speed error range falls within the speed error range. If the target speed error range is within the speed error range, then this target speed error range is used to update the speed error range, and the updated target speed error range is outputted to the new target speed curve generating section 156. Otherwise, the section 1552 updates the target speed error range by using the maximum or minimum value of the speed error range. Then, the section 1552 outputs the updated range to the new target speed curve generating section 156.

The new target speed curve generating section 156 produces a new target speed curve that passes through an extremal value in the updated target speed error range. In this new target speed curve, its speed change start point is shifted to the current location.

The new target speed output section 157 uses the new target speed curve outputted from the section 156 to access the human sensitivity model DB 14. Subsequently, the section 157 corrects the values on the new target speed curve at the nodes, and then, outputs the corrected new target speed curve to the speed control section 16.

In this embodiment, the human sensitivity model DB 14 contains beforehand the acceleration or the gradient of the acceleration over a route in order to prevent a driver from feeling uncomfortable. In addition, the human sensitivity model DB 14 contains the "node-to-node link distance", "node-to-node link width", "node-to-node link number", and "node-to-node link speed".

The target speed curve learning memory section 158 memorizes the new target speed curve, whenever a vehicle runs on a certain route. Then, when a vehicle approaches the route, the target speed curve learning memory section 158 outputs the new target speed curve to the speed control section 16.

Figure 13:
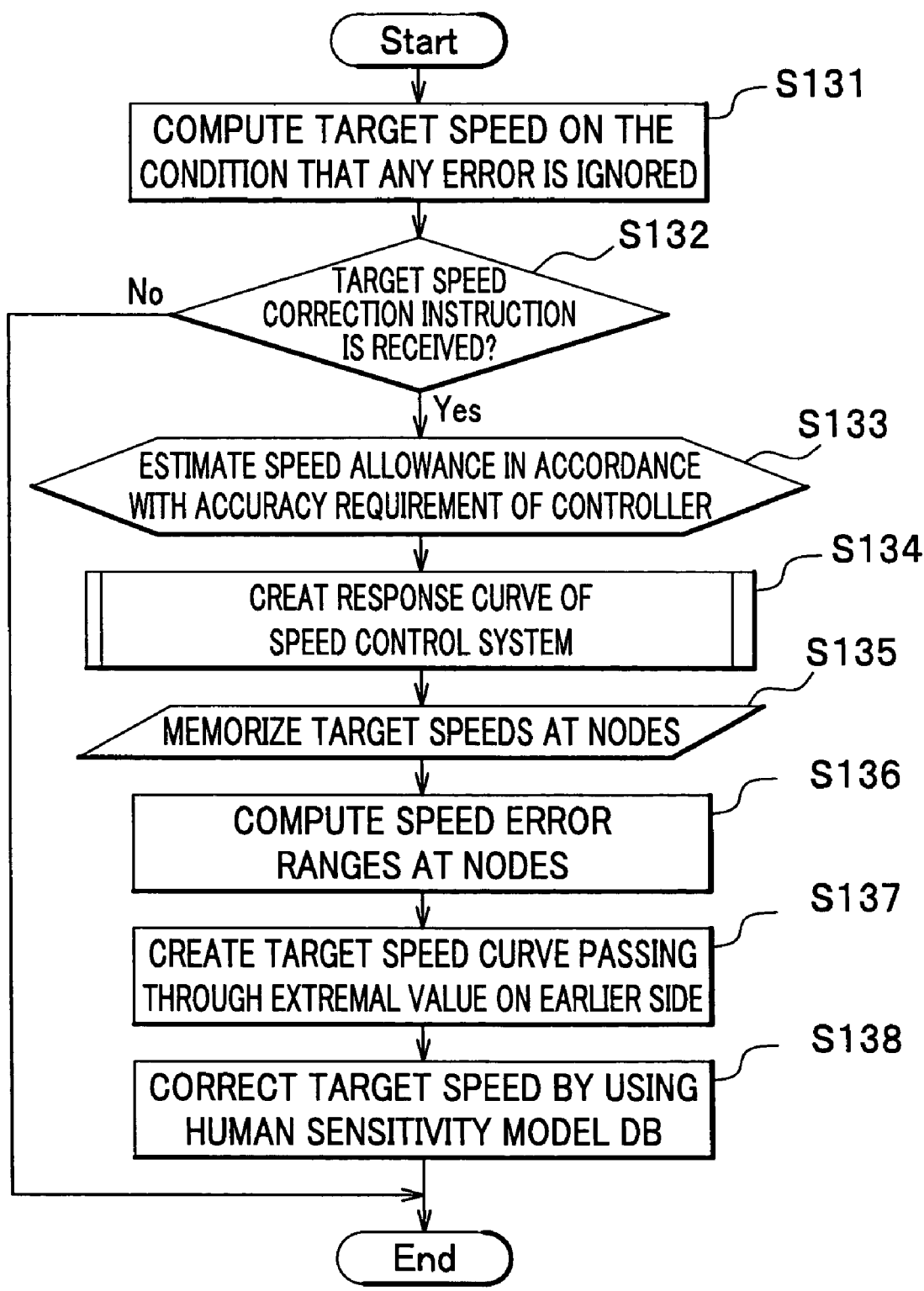
FIG. 13 is a flowchart showing a process for correcting a target speed in the vehicle speed control device.

FIG. 13 shows a flowchart of a process for executing a target speed correction algorithm. The target speed calculation section 15 corrects the target speed by executing this process, upon reception of the target speed correction instruction from the current location error estimation section 13.

A detailed description will be given below, of the operations of the target speed calculation section 15 with reference to this flowchart.

Prior to the description of the operations, a brief description will be given below, of a speed control system equipped with the vehicle speed control device according to an embodiment of the present invention, with reference to a block diagram of FIG. 14.

Figure 14:
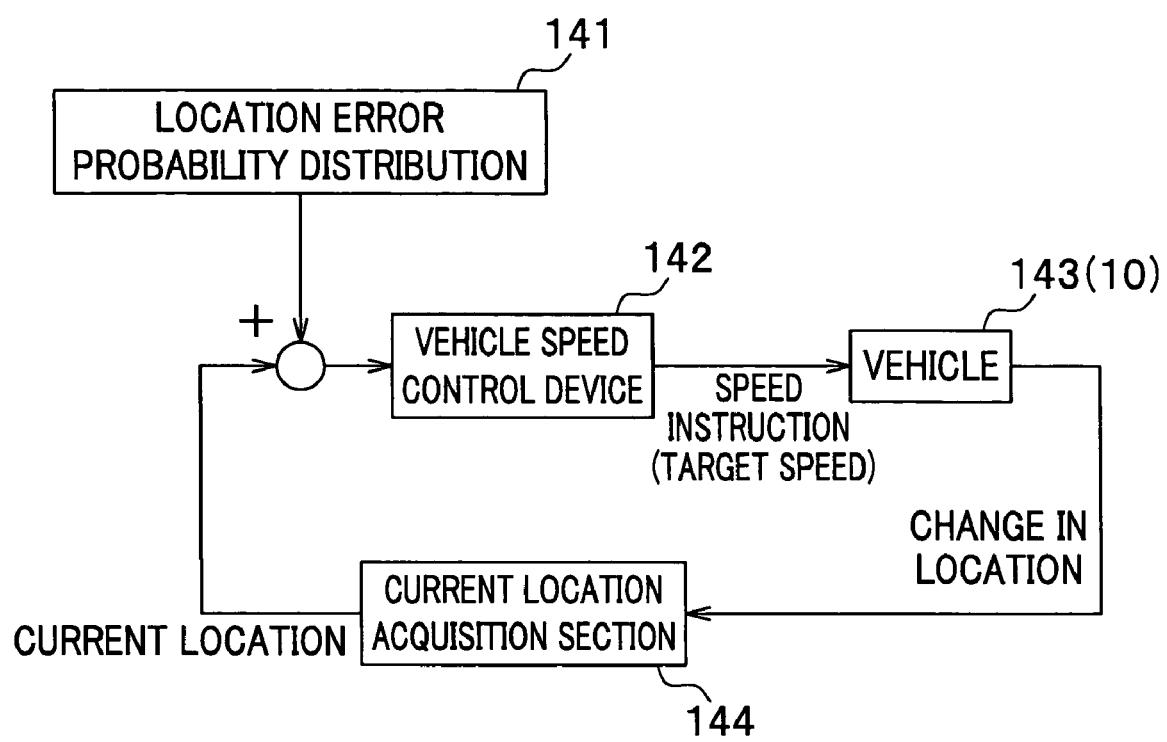
FIG. 14 is a block diagram showing a speed control system in the vehicle speed control device.

FIG. 14 shows a block diagram of a speed control system, which receives current location information and outputs a speed instruction (or target speed). The speed control system varies the speed of a vehicle 143 in response to a speed instruction from the vehicle speed control device 142. The current location acquisition section 144 senses any change in the location of the vehicle with time passing, and then, feedbacks the sensed location to the vehicle speed control device 142. As a result, it is possible to model a speed control system to which the location error probability distribution (disturbance) is inputted, before the vehicle speed control device 142 receives the location information.

The vehicle speed control device 142 is configured to be installed in a speed feedback control system as shown in FIG. 14. In addition, the device 142 does not re-compute the current location, after a target speed is determined on the condition that an error is taken into consideration. Furthermore, since the vehicle speed control device 142 determines the target speed allowing for an error, its speed change start point can be positioned nearer the current location than that determined in ignorance of an error. This reason will be described below.

In order to determine the speed change start point, the target speed calculation section 15 needs to correct a target speed in ignorance of an error to a target speed allowing for an error.

An algorithm for correcting a target speed will be described by using a modeled speed control system.

Figure 15:
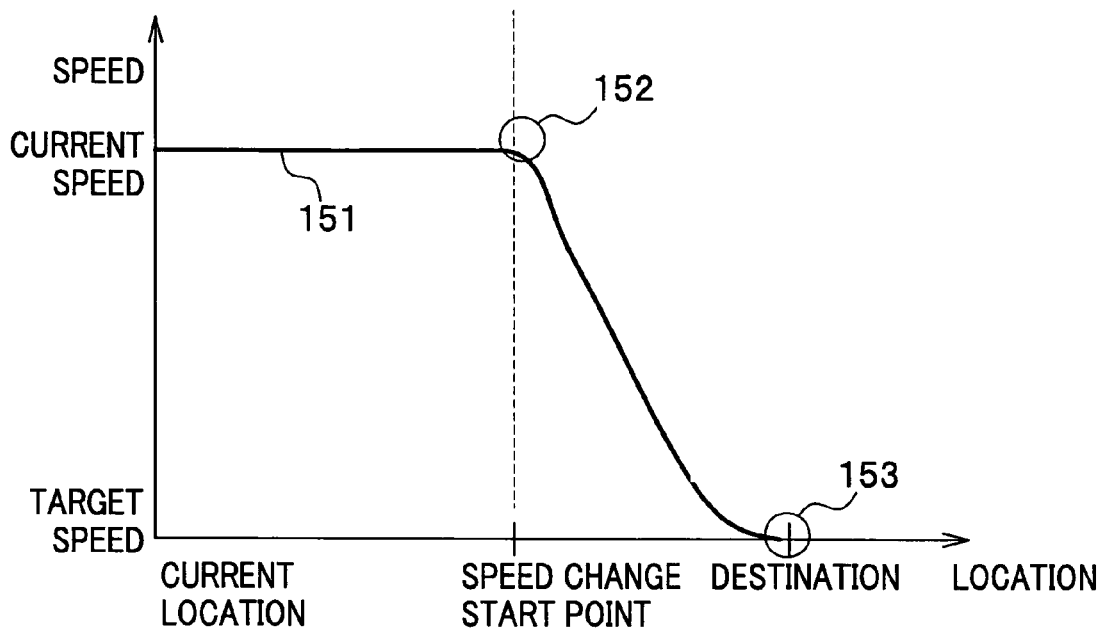
FIG. 15 is a graph showing an example of a target speed curve determined by the vehicle speed control device on the condition that an error is ignored.

It is assumed that the function computing section 151 has already computed a target speed on the condition that an error (or disturbance) is ignored (S131), and the computed target speed draws a target speed curve of FIG. 15.

In FIG. 15, the vertical axis represents a target speed, and the horizontal axis represents the location of a vehicle. A thick line 151 indicates a computed target speed curve, and a portion 152 is a speed change start point. Moreover, a portion 153 is a destination, and a speed at the portion (destination) 153 shows a last target speed.

The function of the target speed is expressed by the following equation (3).

$$\text{Target speed} = v(\text{location coordinates}) \quad (3)$$

Where v( ) is a function for the target speed determined at S131, and the parenthesis expresses the parameter of the function.

The target speed calculation section 15 checks whether or not the target speed correction instruction is received (S132) If the target speed correction instruction is received ("Yes" at S132), then the process proceeds to the step S133. Otherwise ("No" at S132), the target speed determined at the step S131 is outputted to the speed control section 16. If the target speed correction instruction is received, then the allowable speed error determining section 152 estimates a speed margin in accordance with the accuracy requirement of the speed control section 16 (S133).

Figure 16:
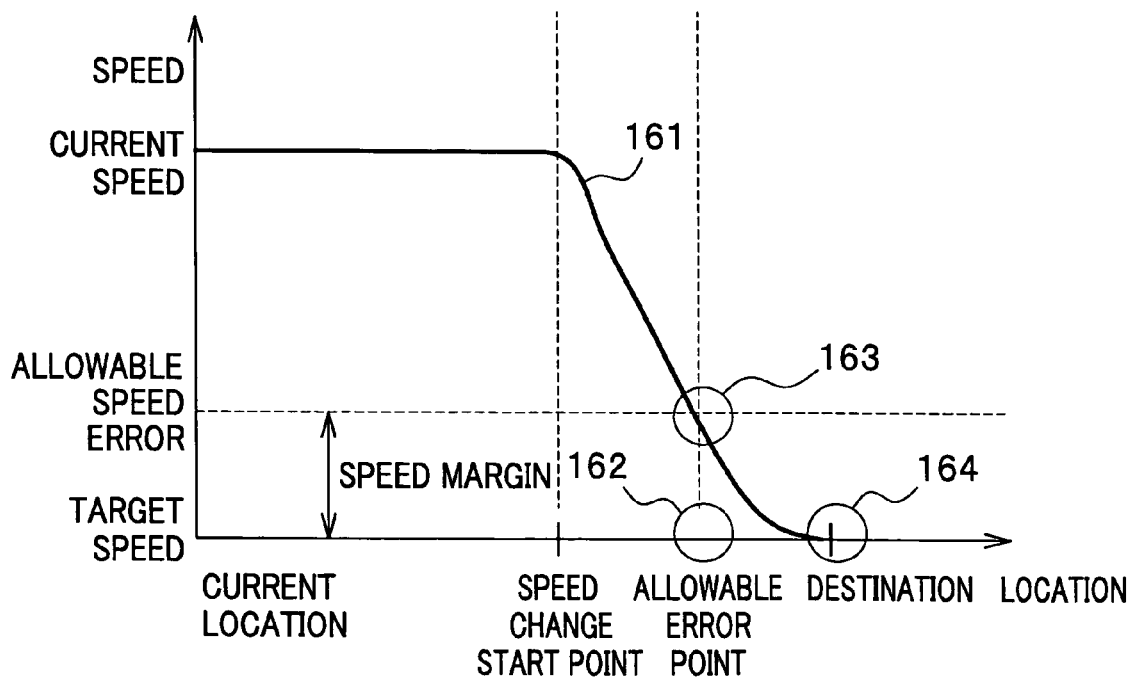
FIG. 16 is a graph showing an example of a target speed curve for introducing a speed margin in accordance with accuracy requirement of a controller in the vehicle speed control device.

Specifically, as shown in FIG. 16, the allowable speed error determining section 152 pinpoints a speed value 163 on a target speed curve 161 (drawn at the step S131) at an allowable error point 162. In this case, the difference between the speed value 163 and the last target speed 164 corresponds to a speed margin. The speed margin is expressed by the following equation (4).

$$\text{Speed margin} = v(\text{allowable error location}) - \text{last target speed} \quad (4)$$

The response curve generating section 153 receives the location error probability distributions at the nodes from the current location error estimation section 13. Then, the section 153 inputs the received location error probability distributions to the speed control system of FIG. 14 as a disturbance 141. As a result, a response curve of the speed control system is created (S134).

Figure 17:
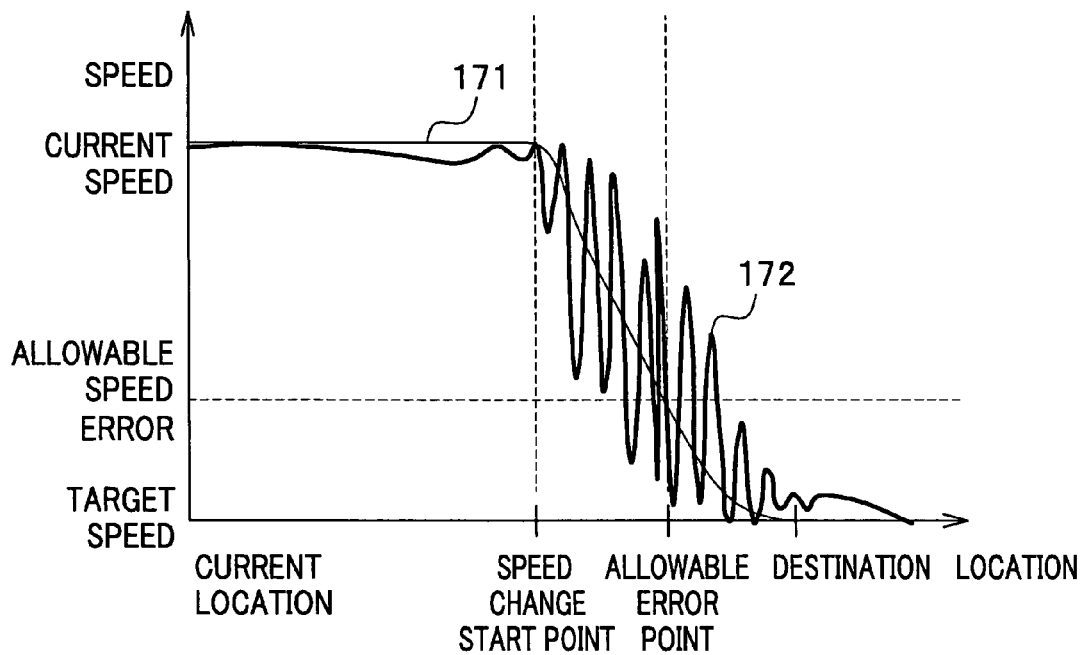
FIG. 17 is a graph showing an example of a response curve when an error probability distribution is inputted to the vehicle speed control device as disturbance.

FIG. 17 shows an example of this response curve. Referring to this figure, the target speed curve (thin line) 171 is determined at the step 131, and the response curve (heavy line) having a certain amplitude is determined at the step 134. The response curve generating section 153 allows the target speed values on the response curve at the nodes to be memorized in the speed memory section 154 (S135).

Figure 18:
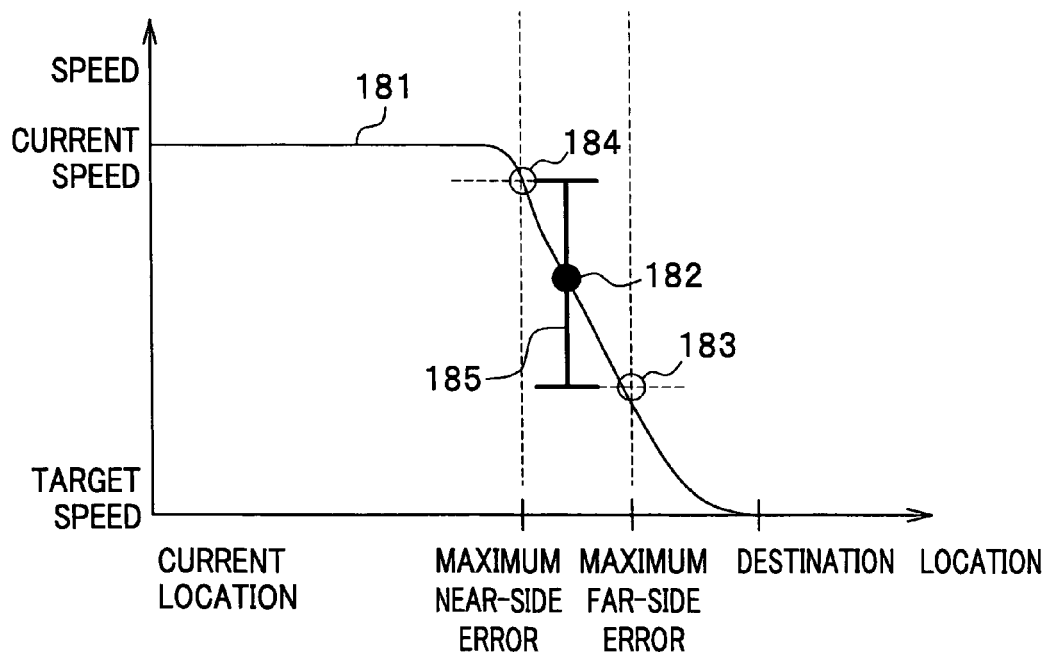
FIG. 18 is a graph showing an example of a target speed curve for setting a speed error range in the vehicle speed control device.

The target speed error range update section 155 determines the speed error range 185 at each node, as shown in FIG. 18 (S136). An error range 185 of the target speed at each node is determined by the location error probability. Furthermore, a target speed value 182 on the target speed curve 181 at a certain node, which is determined at the step S131, contains an error on the near and far sides with reference to the current location. The maximum value of the error on the near side is made a maximum near-side error, and the maximum value of the error on the farther side is made a maximum far-side error. On the target speed curve 181 determined at the step S131, the range between the target speed 183 at the maximum far-side error and the target speed 184 at the maximum near-side error is defined by an error range 185 of the target speed.

In the deceleration, the maximum and minimum target speeds are expressed by the following equation (5). In the acceleration, on the other hand, the maximum and minimum target speeds are expressed by the following equation (6).

Node n: maximum target speed=v(location coordinate at node n−maximum near-side error)

minimum target speed=v(location coordinates at node n+maximum far-side error)     (5)

Node n: maximum target speed=v(location coordinates at node n+maximum near-side error)

minimum target speed=v(location coordinates at node n−maximum far-side error)     (6)

Figure 19:
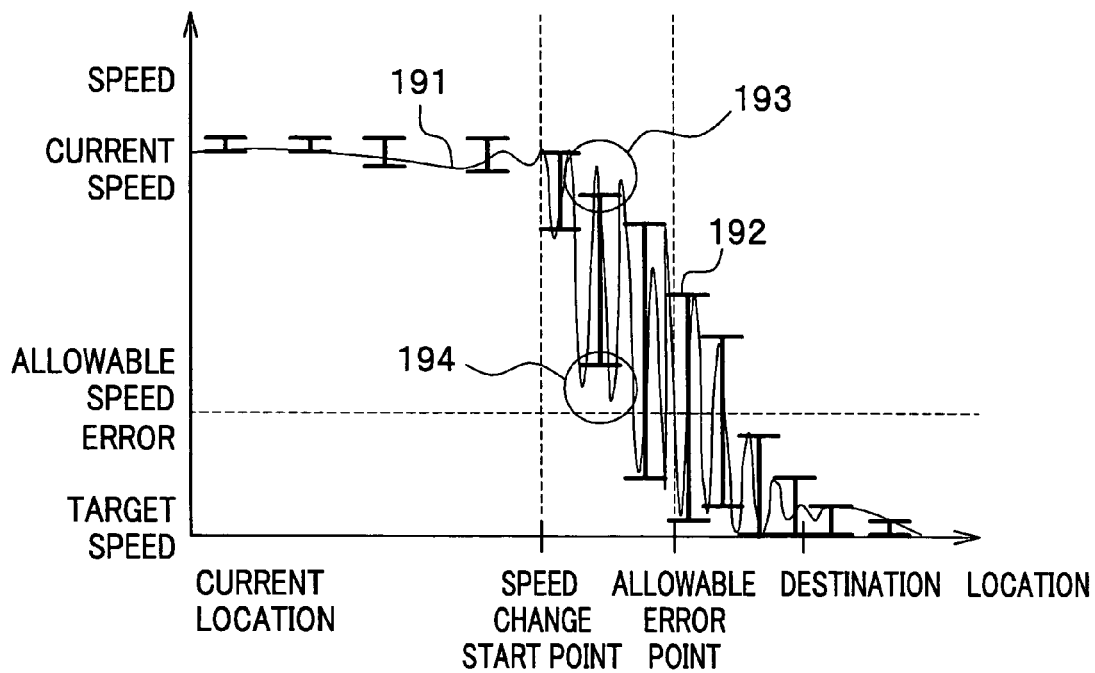
FIG. 19 is a graph showing an example of a target speed curve for comparing speed error ranges at nodes in the vehicle speed control device.

As shown in FIG. 19, the function determined by the equation (3) converges to a certain speed, as the current location is approaching the destination. Also, the amplitude of the target speed converges to a certain range.

The speed error range 192 is determined as follows. The target speed update section 155 (location error probability distribution/speed error range conversion section 1551) converts the probability distribution of the location error at each node into a speed error by using the equations (5) and (6). Then, the target speed update section 155 pinpoints maximum and minimum values. The maximum and minimum values are those of the speed error range 192.

The speed error range comparison section 1552 compares the speed error range (maximum value, minimum value) with the target speed at each node recorded in the speed memory section 154. If the values on the target speed curve 191 falls within the speed error range, then this speed error range is employed, and it is then outputted to the new target speed curve generating section 156. Otherwise, if a value on the target speed curve 191 (for example, the speed value 193 or the speed value 194 of FIG. 19) falls outside the speed error range 192, then this value is replaced by the maximum or minimum value of the speed error range 192.

Figure 20:
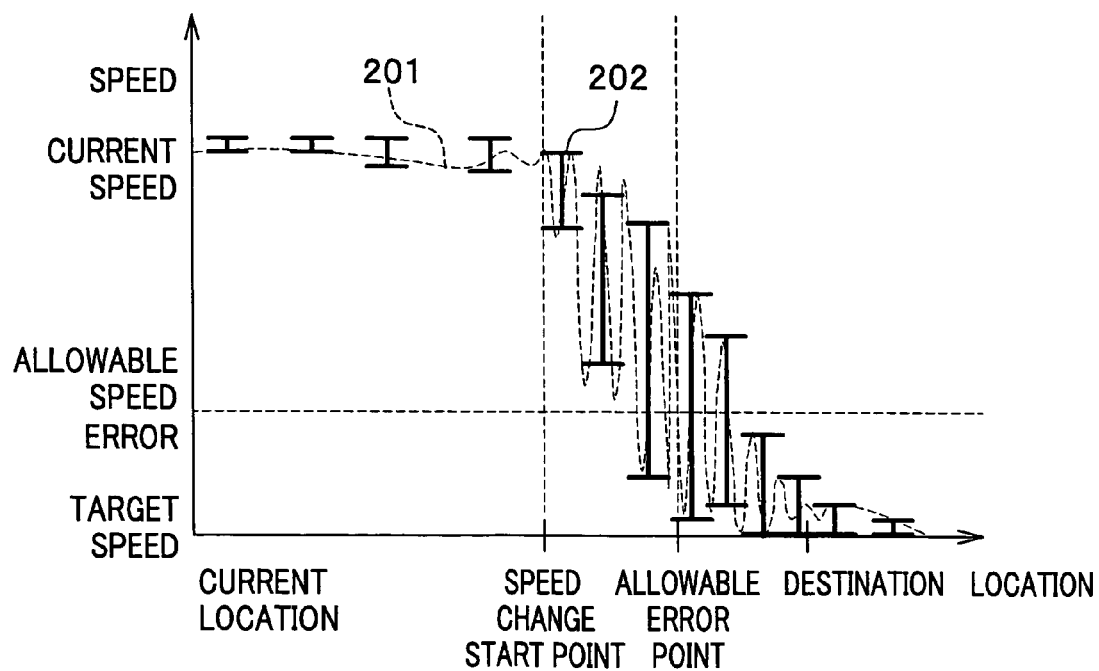
FIG. 20 is a graph showing an example of a target speed curve for determining speed error ranges at nodes in the vehicle speed control device.

As a result of updating the target speed, a new speed error range 202 is determined as shown in FIG. 20. Since this speed error range 202 is equivalent to a range of the curve computed at the step S131, the curve computed at the step S131 is included in this range, and the target speed 201 recorded in the speed memory section 154 is also included in the range.

Figure 21:
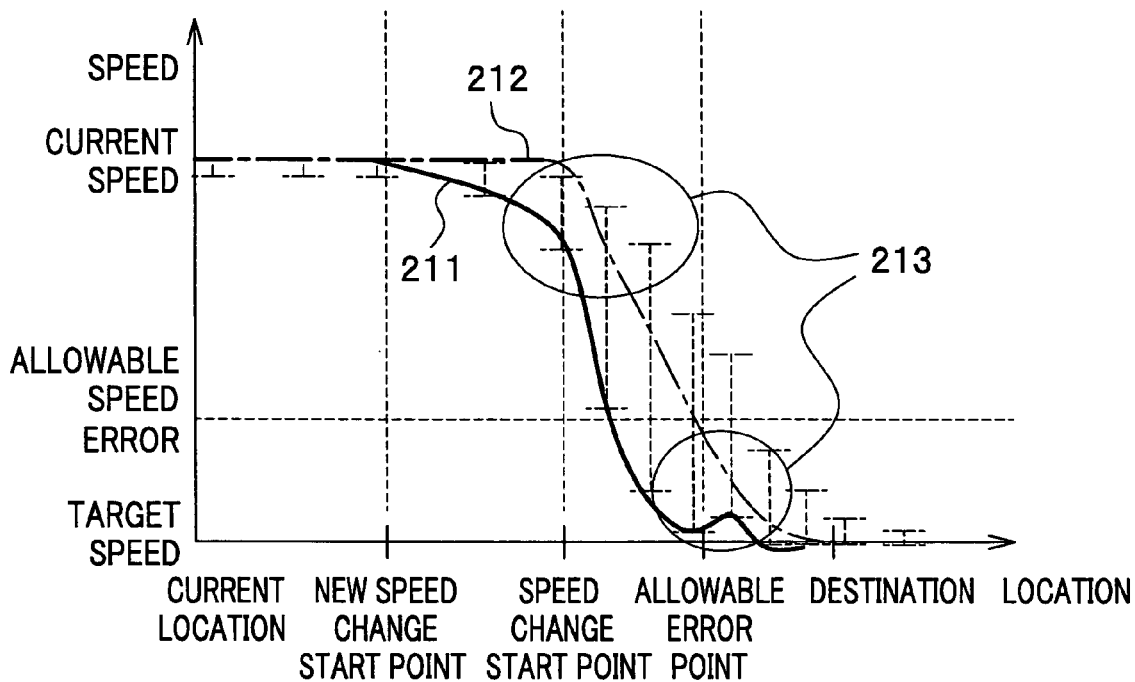
FIG. 21 is a graph showing an example of a new target speed curve plotted based on the speed error ranges in the vehicle speed control device.

The new target speed curve generating section 156 creates a target speed curve 211 (S137). This curve passes through one of extremal values of the speed error range (determined at S136), which is positioned on the near side with reference to the current location, as shown in FIG. 21. In this case, the extremal value on the near side is an extremal value of the target speed determined on the condition that an error on the near side is taken into consideration.

In deceleration, the extremal value on the side of the current location (left side of FIG. 21) is a minimum target speed. In acceleration, the extremal value on the side of the destination (right side of FIG. 21) is a maximum target speed. In order to reduce the curvature of the curve 211, that is, in order to decrease the gradient of the acceleration, it is preferable that a target speed curve 211 is produced by the cubic spline interpolation. The cubic spline interpolation is disclosed by a reference 3.

(Reference 3)

Daisuke Takahashi, "Rikoukei no kiso suugaku 8: suuchi keisan (Basic mathematics of science and technology 8: numerical calculation)" Iwanami shoten publishing, Feb. 16, 1996, ISBN: 4-00-007978-6

The target speed curve 211 has the minimum gradient of the acceleration. Furthermore, the speed change start point of the target speed curve 211 is nearer the current location than that of the target speed curve 212.

The new target speed output section 157 accesses the human sensitivity model DB 14, and then, determines whether or not the values on the speed curve produced by the new target speed curve generating section 156 is compliant with the human sensitivity. If any non-compliant value is detected, then the new target speed output section 157 modifies the target speed values at nodes having the non-compliant value (step S138).

Figure 22:
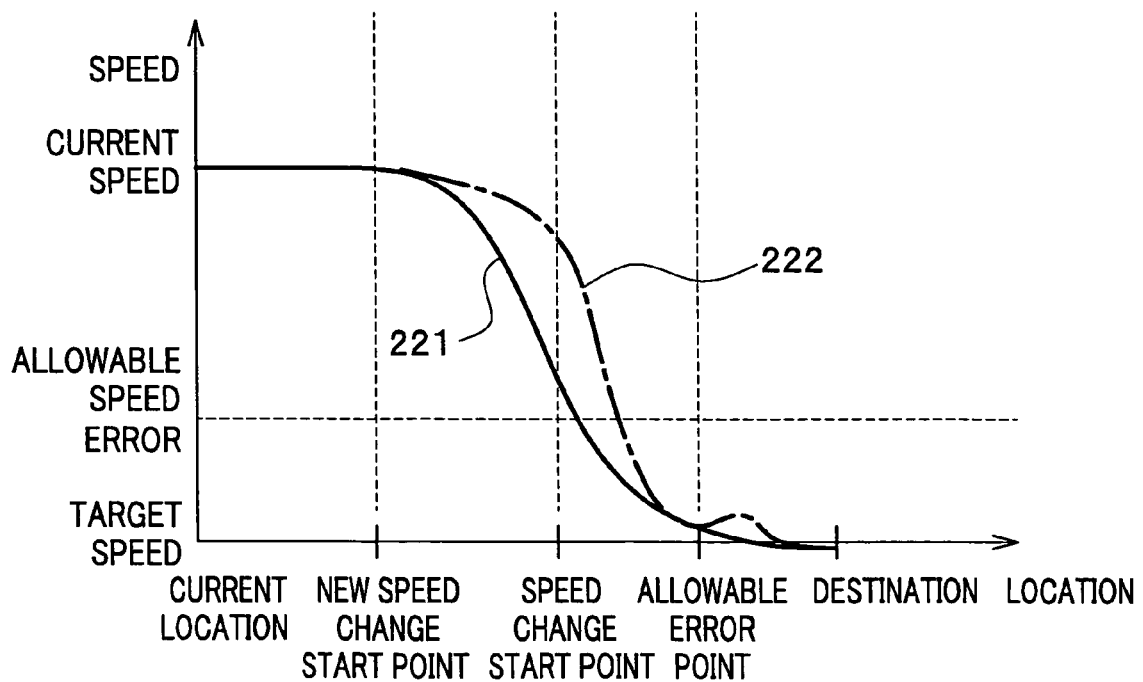
FIG. 22 is a graph showing another example of a new target speed curve in the vehicle speed control device.

To give an example, it is assumed that the portions 213 of the target speed curve 211 of FIG. 21 are determined not to accord with the human sensitivity model at the step S137. In this case, as shown in FIG. 22, the target speed curve 211 is corrected into the new target speed curve 221, based on the human sensitivity model. The speed change start point of the new target speed curve 221 is the same as that of the target speed curve 222 or nearer to the current location than that of the target speed curve 222. In this case, note that the values on the new target speed curve 221 do not need to fall within the speed error range determined at S136. It is preferable that the new target speed curve 221 is produced by means of the spline interpolation.

The target speed determined in this way is supplied to the speed control section 16. The speed control section 16 senses the speed of a vehicle and, then adjusts the driving torque so that the speed reaches the target speed.

Whenever a vehicle runs on a route, the target speed curve learning memory section 158 memorizes the new target speed curve (or the output of the new target speed output section 157) in relation to this route. In the future, when the vehicle runs on this route, the target speed curve learning memory section 158 outputs, to the speed control section 16, the target speed curve corresponding to the route. A way how to learn the target speed curve is disclosed in detail by Japanese Unexamined Patent Application Publication 2005-297621.

The user interface section 17 allows the target speed from the target speed calculation section 15 to be invalid, if the current location of a vehicle is not sensed. Following this, the section 17 informs a driver that the speed cannot be controlled, through a display of a car navigation system or a voice signal.

First Example of how to Compute Target Speed

Some examples will be given below, of how to compute a target speed from a current location to a destination.

First, a process for stopping a vehicle in front of a stop line will be explained. A vehicle is equipped with the vehicle speed control device 142 and the speed control section 16. In addition, the vehicle is configured to detect a stop line precisely, for example, with the radar camera 9 covering the allowable error range of the speed control section 16. Furthermore, the vehicle is provided with a car navigation system including the map information DB 11 and the current location acquisition section 12. The speed control section 16 gives higher priority to a speed instruction produced by detecting the stop line than a target speed instruction from the vehicle speed control device 142.

The following steps are to be executed in accordance with the flowchart of FIG. 23;
  searching a route;
  detecting a stop line;
  computing a target speed from a current location to the stop line, and
  outputting a target speed instruction to the speed control section 16.

In the flowchart of FIG. 23, the car navigation system has already searched a route, that is, has determined a route on which the vehicle is to run ("Yes" at S231). The car navigation system acquires a node number of a stop line on the route from the map information DB 11 (S232). Simultaneously, the current location acquisition section 12 obtains the current location of the vehicle (S233). In this case, the car navigation system does not determine whether or not the current location and a destination are set at S234. This is because the route has been set at S231.

The car navigation system determines whether or not the vehicle is on a road in the map information, based on the map information and current location acquired at the steps S232 and S233 (S235). In this case, it is assumed that the vehicle is on a road in the map information, that is, map matching is possible. Therefore, the process proceeds to a step S236. Following this, the current location acquisition section 12 acquires the following information from the map information DB 11:
  the number of nodes on the route from the current location to the stop line;
  the coordinates of the nodes;
  the area attribute information on the nodes;
  the coordinates of the fixed measurement point nodes;
  the coordinates of the stop line;
  the link distances between the nodes; and
  the node-to-node link speeds.
Then, the current location acquisition section 12 outputs the above information to the target speed calculation section 15 (S236).

Once receiving the information, the target speed calculation section 15 outputs the following information to the human sensitivity model DB 14 (S237);
  the area attribute information on the nodes:
  the distances from each of the nodes to a destination; and
  the speeds of the vehicle at past several seconds.
Then, the target speed calculation section 15 computes the acceleration of the vehicle and the gradient of the acceleration, based on the distance from the node to the destination and the speed of the vehicle at past several seconds. Further, the section 15 determines a sensitivity coefficient, based on the area attribute information on the nodes and the distance from the node to the destination.

The sensitivity coefficient can be determined by the equation (1). The acceleration and the gradient of the acceleration are determined such that the determined sensitivity coefficient is lower than the sensitivity coefficient determined from the sensitivity coefficient table of FIG. 4, and is as close to the sensitivity coefficient determined from the sensitivity coefficient table as possible. The target speed calculation section 15 creates the target speed curve between the node of the current location to the node of the stop line, based on the acceleration, the gradient of the acceleration and the node-to-node link speed (S237).

After the creation of the target speed curve, the current location error estimation section 13 executes the process for producing the interpolation probability distribution that is shown in FIG. 11 (S238).

To demonstrate, the current location error estimation section 132 obtains, from the map information DB 11, the number of the nodes on the route from the current location to the stop line, the area attribute information on the nodes, the coordinates of the fixed measurement point nodes, the coordinates of the stop line, and the node-to-node link distances. The error probability distribution interpolation section 134 in the current location error estimation section 13 acquires the current location area information containing the fixed measurement points around the current location.

The error probability distribution interpolation section 134 extracts the area attribute information on the nodes from the current location area information, and then, sends it to the error probability distribution interpolation pattern DB 135. The error probability distribution interpolation pattern DB 135 returns the interpolation patterns of the error probability distributions at the nodes to the error probability distribution interpolation section 134. At the same time, the error probability distribution interpolation section 134 acquires the location error probability distribution between the adjacent fixed measurement point nodes from the fixed measurement point error probability distribution DB 132. The error probability distribution interpolation section 134 computes the error probability distributions at nodes between the two fixed measurement point nodes. Then, section 134 outputs them to the target speed calculation section 15 as the error probability distributions of the control-executed zone.

The target speed calculation section 15 executes the process for correcting the target speed that is shown in FIG. 13 (S239).

The target speed calculation section 15 receives a correction instruction, and determines an allowable error point (point 162 of FIG. 16) from the stop line, based on the accuracy requirement of the speed control section 16. The target speed calculation section 15 allows the target speed value 163 on the target speed curve 161 at the allowable error point to be memorized in an internal memory (not shown) as a speed margin. The internal memory also memorizes the target speed (point 172 of FIG. 17) produced by inputting the error probability distribution to the speed control system of the vehicle.

In this case, since the vehicle needs to decelerate, the target speed calculation section 15 determines the minimum target speeds 183 at the nodes, based on the target speed (point 182 of FIG. 18) and the speed error range 185. Subsequently, the section 15 plots the minimum target speeds 183 at the nodes by means of the cubic spline interpolation and, then accesses the human sensitivity model DB 14. If at least one of the accelerations or the gradients of the gradients does not match with the sensitivity coefficient of the human sensitivity model DB 14 (points 213 of FIG. 21), then the target speed calculation section 15 creates the new target speed curve (point 221 of FIG. 22) (S240).

The new target speed curve is delivered to the speed control section 16 (S241). Finally, the speed control section 16 adjusts the speed of the vehicle to the target speed in accordance with the flow of FIG. 5.

Second Example of how to Compute Target Speed

Next, an explanation will be given below, a process for decreasing the speed of a running vehicle from 50 km/h to 30 km/h around an entry of a school zone. In addition, a car navigation system does not search a route.

A vehicle is equipped with the vehicle speed control device 142 and the speed control section 16. In addition, the vehicle is configured to detect the entry of the school zone precisely, for example, by using the radar camera 9 covering the allowable error range of the speed control section 16. Furthermore, the vehicle is provided with a car navigation system including the map information DB 11 and the current location acquisition section 12. The speed control section 16 gives higher priority to a speed instruction produced by detecting the entry of the school zone than a target speed instruction from the vehicle speed control device 142.

A process for detecting an entry of a school zone, computing a target speed from a current location to the entry of the school zone, and sending a target speed correction instruction to the speed control section 16 are to be executed in accordance with the flowchart of FIG. 23.

In this example, it is assumed that the car navigation system has not searched a route, before the vehicle speed control device 142 computes a target speed ("No" at S231). The current location acquisition section 12 acquires a node number of the entry of the school zone from the map information DB 11 (S232). At the same time, the current location acquisition section 12 obtains the current location of the vehicle (S233).

The car navigation system determines whether to identify a route of the vehicle, that is, whether or not the map matching is possible (S234). In this case, the map matching is determined to be possible ("Yes" at S234). Hence, the process proceeds to S235.

The car navigation system determines whether or not the vehicle is on a road contained in the map information, based on the map information and the current location acquired at the steps S232 and S233 (S235). In this case, the vehicle is determined to be on a road contained in the map information. Accordingly, the process proceeds to the step S236.

The current location acquisition section 12 acquires the following information from the map information DB 11 (S236):
  the number of the nodes on the route from the current location to the entry of the school zone (destination);
  the area attribute information at the nodes;
  the coordinates of the fixed measurement point nodes;
  the coordinates of entry of the school zone;
  the link distances between the nodes; and
  the node-to-node link speeds The above information is sent to the target speed calculation section 15.

Upon reception of the above information, the target speed calculation section 15 sends the following information to the human sensitivity model DB 14 (S236):
  the area attribute information on the nodes;
  the distances from each of the nodes to the destination; and
  the speeds of the vehicle at past several seconds.

Then, the target speed calculation section 15 computes the acceleration of the vehicle and the gradient of the acceleration, based on the distance from the node to the destination and the speeds of the vehicle at past several seconds.

Subsequently, the target speed calculation section 15 determines a sensitivity coefficient that is computed based on the area attribute information and the distance from the node to the destination.

The sensitivity coefficient can be determined by the equation (1). The acceleration and the gradient of the acceleration are determined such that the determined sensitivity coefficient is lower than the sensitivity coefficient determined from the sensitivity coefficient table of FIG. 4, and is as close to the sensitivity coefficient determined from the sensitivity coefficient table as possible. The target speed calculation section 15 creates the target speed curve on the route from the node of the current location to the node of entry of the school zone, based on the acceleration, the gradient of the acceleration and the node-to-node link speeds (S237).

After the target speed curve is created, the process proceeds to the step S238. In other words, the current location error estimation section 13 executes the steps of generating an interpolate probability distribution of FIG. 11. To demonstrate, the current location error estimation section 13 acquires the following information from the map information DB 11:
  the number of the nodes on the route from the current location to the entry of the school zone;
  the area attribute information on nodes;
  the coordinates of the fixed measurement point nodes;
  the coordinates of entry of the school zone; and
  the node-to-node link distances.

The error probability distribution interpolation section 134 in the current location error estimation section 13 obtains the current location area information including the fixed measurement points. The error probability distribution interpolation section 134 sends the area attribute information on the nodes in the current location area information to the error probability distribution interpolation pattern DB 135. Subsequently, the error probability distribution interpolation section 134 acquires the interpolation patterns of the error probability distributions at the nodes from the error probability distribution interpolation pattern DB 135. Moreover, the error probability distribution interpolation section 134 acquires, from the fixed measurement point error probability distribution DB 132, a location error probability distribution at adjacent fixed measurement point nodes within a controlled area. The error probability distribution interpolation section 134 computes error probability distributions at nodes between two fixed measurement point nodes, and outputs, to the target speed calculation section 15, the location error probability distributions within the control-executed zone, as the target speed correction instruction.

The target speed calculation section 15 executes the process for correcting the target speed that is shown in FIG. 13 (S239).

The target speed calculation section 15 receives the speed correction instruction. In response to this instruction, the section 15 computes allowable error points (point 162 of FIG. 16) at the nodes to the entry of the school zone in accordance with the accuracy requirement of speed control section 16, and memorizes, as speed margins, the target speed values on the target speed curve 161 at the allowable error points. The target speed calculation section 15 memorizes target speed values (point 172 of FIG. 17) at the nodes, when the speed control system of the vehicle receives the error probability distributions at the nodes.

Since the vehicle decelerates toward the entry of the school zone, the target speed calculation section 15 determines the minimum target speeds 183, based on the target speeds (point 182 of FIG. 18) and the speed error range 185. The target speed calculation section 15 plots the minimum target speeds 183 at the nodes by means of the cubic spline interpolation, thereby creating a target speed curve (curve 211 of FIG. 21). Then, the target speed calculation section 15 accesses the human sensitivity model DB 14.

If at least one value on the created target speed curve does not accord with that contained in the human sensitivity model DB 14 (points 213 of FIG. 21), then the target speed calculation section 15 deletes the target speed curve 211, and creates a new target speed curve (curve 221 of FIG. 22) (S240). The new target speed is delivered to the speed control section 16 (S241). Finally, the speed control section 16 adjusts the speed of the vehicle to the target speed in accordance with the flow of FIG. 5.

Third Example of how to Compute Target Speed

In this example, it is assumed that the human sensitivity model DB 14 contains beforehand a maximum speed at which a vehicle is permitted to run.

A process for detecting an entry of a school zone, computing a target speed from a current location to the entry of the school zone, and sending a target speed correction instruction to the speed control section 16 are to be executed in accordance with the flowchart of FIG. 23.

In this example, the car navigation system has not searched a route, before the vehicle speed control device 142 computes a target speed ("No" at S231).

The car navigation system determines whether to identify a route of the vehicle, that is, whether the map matching is possible or not (S234). In this case, the map matching is determined to be possible ("Yes" at S234) Hence, the process proceeds to the step S235.

The car navigation system determines whether or not the vehicle is on a road contained in the map information (S235). In this case, the vehicle is determined to be on a road contained in the map information ("Yes" at S235). Accordingly, the process proceeds to the step S236.

The current location acquisition section 12 acquires the following information from the map information DB 11 (S236):
 the number of the nodes on the route from the current location to the entry of the school zone (destination);
 the area attribute information on the nodes;
 the coordinates of the fixed measurement point nodes;
 the coordinates of entry of the school zone;
 the link distances between the nodes; and
 the node-to-node link speeds
The above information is sent to the target speed calculation section 15.

Upon reception of the above information, the target speed calculation section 15 sends the following information to the human sensitivity model DB 14:
 the area attribute information on the nodes;
 the distances from each of the nodes to the destination; and
 the speeds of the vehicle at past several seconds.
Then, the target speed calculation section 15 computes the acceleration of the vehicle and the gradient of the acceleration, based on the distance from the node to the destination and the speeds of the vehicle at past several seconds.

Subsequently, the target speed calculation section 15 determines a sensitivity coefficient that is computed based on the area attribute and the distance from the node to the destination.

The sensitivity coefficient can be determined by the equation (1). The acceleration and the gradient of the acceleration are determined such that the determined sensitivity coefficient is lower than the sensitivity coefficient determined from the sensitivity coefficient table of FIG. 4, and is as close to the sensitivity coefficient determined from the sensitivity coefficient table as possible.

The target speed calculation section 15 creates the target speed curve on the route from the current location to the entry of the school zone, based on the acceleration, the gradient of the acceleration and the node-to-node link speed (S237).

After the target speed curve is computed, the target speed calculation section 15 outputs the following information to the current location error estimation section 13 (S238):
 the information on nodes;
 the area attribute information on the nodes;
 the fixed measurement point nodes; and
 the destinations.

Consequently, the current location error estimation section 13 executes the process for generating the interpolate probability distribution that is shown in FIG. 11.

Specifically, the current location error estimation section 13 acquires the following information from the map information DB 11:
 the number of nodes from the current location to the entry of the school zone;
 the area attribute information on the nodes;
 the coordinates of the fixed measurement point nodes;
 the coordinates of the entry of the school zone; and
 the node-to-node link distances.
The error probability distribution interpolation section 134 obtains the current location area information including the fixed measurement points around the vehicle. The error probability distribution interpolation section 134 sends, to the error probability distribution interpolation pattern DB 132, the area attribute information of the nodes which is obtained from the current location area information. Then, the error probability distribution interpolation pattern DB 132 outputs the interpolation patterns of error probability distributions of the nodes to the error probability distribution interpolation section 134 through the location error probability distribution acquisition section 133. The error probability distribution interpolation section 134 obtains the location error probability distributions at the two fixed measurement point nodes. The section 134 computes error probability distributions of the nodes between the two fixed measurement point nodes. Then, the section 134 outputs them to the target speed calculation section 15 as error probability distributions of the control-executed zone (S239).

Upon reception of a correction instruction, the target speed calculation section 15 determines allowable error points to the entry of the school zone in accordance with the accuracy requirement of the speed control section 16 (point 162 of FIG. 16). Then, the section 15 memorizes target speed values 163 on the target speed curve 161 at the allowable error points as speed margins. The target speed calculation section 15 memorizes the target speeds (point 172 of FIG. 17), when the speed control system of the vehicle receives the error probability distributions at the nodes. In this example, since the vehicle decelerates toward the entry of the school zone, the target speed calculation section 15 determines minimum target speeds 183 at the nodes, based on the target speed 172 and the speed error range (range 185 of FIG. 18).

The target speed calculation section 15 plots the minimum target speeds 183 by means of the cubic spline interpolation, and computes the acceleration and the gradient of the acceleration between the nodes. Subsequently, the section 14 accesses the human sensitivity model DB 14. If at least one of the target speeds at the nodes does not accord with the maximum speed in the area where the vehicle is permitted to run (portions 213 of FIG. 21), then the target speed calculation section 15 deletes the target speed 211. The target speed calculation section 15 re-accesses the human sensitivity model DB 14, and allows the maximum speed in the DB 14 to be a target speed in an area where the vehicle is running. The target speed calculation section 15 checks whether or not the acceleration and the gradient of the gradient which are both determined by the maximum speed are smaller than those in the human sensitivity model DB 14. If the acceleration and the gradient of the gradient which are both determined by the maximum speed are greater, then the target speed calculation section 15 deletes them and produces a new target speed curve (point 221 of FIG. 22) by means of the spline interpolation (S240).

The new target speed is sent to the speed control section 16 (S241), and the speed control section 16 executes the process of FIG. 5, that is, adjusts the speed of the vehicle to the target speed.

It is preferable that the maximum speed determined in the above way is stored in the human sensitivity model DB 14 in terms of the performance. This is because the calculation of the maximum speed can be omitted in the case where the stored speed is slower than that determined by accessing the human sensitivity model DB 14 when the speed of the vehicle must be reduced excessively. The above case may occur when a road seems dangerous, children are playing on a road, or a road is narrow.

(Exceptional Process)

An explanation will be given below, of a process in which the vehicle speed control device does not compute a target speed or does not send a target speed.

Specifically, this process is performed, when the current location of a vehicle, which is acquired from the current location acquisition section 12, is not contained in the map information, or when the location of a vehicle is determined not to be on a road.

A process for detecting an entry of a school zone, computing a target speed from a current location to a stop point, and sending a target speed correction instruction to the speed control section 16 are to be executed in accordance with the flowchart of FIG. 23.

In this example, the car navigation system has already searched a route, before the vehicle speed control device 142 computes a target speed ("Yes" at S231). The current location acquisition section 12 acquires a node number of the stop point from the map information DB 11 (S232), as well as the current location of the vehicle therefrom (S233). Then, since the route search has been already done at S231, the system does not check whether or not the current location and destination are set (S234).

The car navigation system determines whether or not the vehicle is on a road contained in the map information, based on the map information and the current location. If the location of the vehicle determined not to be on a road, then the vehicle speed control device skips the steps S236 to S241. In other words, the device does not determine a target speed from the current location to the destination. Hence, the vehicle speed control device terminates the target speed computing process of FIG. 23, and informs a driver that the process is terminated, through a screen of the navigation system or a voice signal.

Next, an explanation will be given below, of a process performed in the following situation:
the route search has not been done;
the number of routes on which the vehicle is to run is more than one; and
a distance from a current location to a destination cannot be determined precisely.

A process for detecting the destination, computing a target speed to a stop point, and sending a target speed correction instruction to the speed control section 16 is to be executed in accordance with the flowchart of FIG. 23.

A process for detecting the stop point, computing a target speed from a current location to the stop point, and sending a target speed correction instruction to the speed control section 16 are executed in accordance with the flowchart of FIG. 23.

Since the route search has not been done ("No" at S231), the car navigation system proceeds the process to the step S234.

In the step S234, due to the above situation, the car navigation system cannot compute a distance from the current location to the destination. In this case, the vehicle speed control device terminates this process, and informs a driver that the process is terminated, through the user interface section 17.

However, note that if the speed control section 16 has multiple target speeds, then the speed control section 16 selects which of them is the most appropriate. In this case, the target speed in the target speed calculation section 15 is not always executed by the speed control section 16.

When the following situations occur, the speed control section 16 does not use a target speed from the target speed calculation section 15:
another vehicle breaks in front of the vehicle;
a driver operates an accelerator or brake;
a camera or sensor catches obstacles, people or animals on the route;
the vehicle speed control device does not send a target speed correction instruction; or
the speed control section 16 does not work.

As described above, the vehicle speed control device of FIG. 1 executes the following steps.

1) The vehicle speed control device acquires map information containing an error and a current location sensed by a position sensor.
2) The device (the target speed calculation section 15) determines a target speed, based on the map information and the current location.
3) The device (the current location error estimation section 13) computes a location error probability indicating how long an error the determined target speed contains.
4) The device (the section 13) produces a speed control pattern allowing a driver not to feel uncomfortable by accessing the human sensitivity model DB 14.
5) The device determines a target speed from the current location to a destination by computing an allowable error range in accordance with accuracy requirement of the speed control section 16.
6) The device (the speed control section 16) controls the speed of the vehicle in accordance with the determined target speed.

By executing the above process, the vehicle speed control device predicts the rapid change in the speed of a vehicle, and changes the speed more gradually than the target speed determined on the condition that any error is ignored. This makes it possible to prevent a vehicle from changing its speed rapidly and from passing through a destination, thereby presenting a driver with safe and comfortable drive.

In the above embodiment, the device which senses the location of a vehicle with a GPS has been introduced. However, the present invention is not limited to this system. Alternatively, a system may have a device equipped with a camera or sensor.

Moreover, the device calculates the speed error range by employing the response of the speed controller to the inputted disturbance. However, this calculation may be omitted. Alternatively, the system may determine the target speed error range by converting the error probability distribution into the speed error.

In this embodiment, the sensitivity coefficient is computed by equation (1). However, this present invention is not limited to this computation. Alternatively, the sensitivity coefficient may be computed by the following equation;

$$\text{Sensitivity coefficient} >= \text{constant} + \text{coefficient} \times \text{deceleration (negative acceleration)} + \text{coefficient} \times \text{acceleration} + \text{coefficient} \times (\text{gradient of negative acceleration}) + \text{coefficient} \times (\text{gradient of positive acceleration}) \quad (7)$$

This equation is disclosed by a reference 4:
(Reference 4)
OH et al. "Norigokochi koujyou wo mokuteki tosuru jidousya shiennsisutemu (Automobile drive assist system aimed at making drive more comfortable)" the journal of the institute of electrical engineers of Japan D122 7, heisei 4.

In the above embodiment, the map information DB 11 and the current location acquisition section 12 are separated from each other. However, the present invention is not limited to this configuration. Alternatively, they may be integrated by a single unit having two individual blocks. In this case, the two blocks (the map information DB 11 and the current location acquisition section 12) are connected to each other by a network, and they send/receive information to or from other blocks via any interface or an electric control unit (ECU).

The map information DB 11 and the current location acquisition section 12 are installed in the vehicle speed control device. However, they may be replaced by infrastructure systems. In this case, it is preferable that a radio network is used between the device and infrastructure system. In addition, the human sensitivity model DB 14 may be contained in a dedicated storage apparatus, the map information DB 11 or the current location error estimation section 13. In this case, it is preferable that the human sensitivity model DB 14 is connected to a dedicated storage apparatus, the map information DB 11 or the current location error estimation section 13 via a network, and the DB 14 is connected to other blocks via an in-vehicle network (LAN interconnecting ECU).

The map information DB 11, the fixed measurement point error probability distribution DB 132 in the current location error estimation section 13, the error probability distribution interpolation pattern DB 135, and the human sensitivity model DB 14 may be contained in a single storage system. In this case, these networks are connected to one another via a network, and they are connected to other blocks via an in-vehicle network.

Moreover, at least one of the current location error estimation section 13, the human sensitivity model DB 14, and the target speed calculation section 15 may be contained in the speed control section 16. In this case, the blocks in the speed control section 16 are connected to one another via a network, and they are connected to other blocks via an in-vehicle network.

The human sensitivity model DB 14 may be contained in the target speed calculation section 15. In this case, the human sensitivity model DB 14 and the target speed calculation section 15 are connected to each other via a network, and they are connected to other blocks via an in-vehicle network.

In the above embodiment, the human sensitivity model is computed by the function expressed by the equation (1). However, the present invention is not limited to this computation. Alternatively, another function may be used. For example, the sensitivity coefficient may be expressed by a function determined by the following equations (8) to (22):

$$\text{Sensitivity coefficient} = \text{Function (distance to destination, speed, acceleration, gradient of acceleration, node-to-node link width)} \quad (8)$$

$$\text{Sensitivity coefficient} = \text{Function (distance to destination, speed, acceleration, gradient of acceleration, node-to-node link number)} \quad (9)$$

$$\text{Sensitivity coefficient} = \text{Function (distance to destination, speed, acceleration, gradient of acceleration, node-to-node link information)} \quad (10)$$

$$\text{Sensitivity coefficient} = \text{Function (distance to destination, speed, acceleration, gradient of acceleration, node-to-node link speed)} \quad (11)$$

$$\text{Sensitivity coefficient} = \text{Function (distance to destination, speed, acceleration, gradient of acceleration, node-to-node link width, node-to-node link number)} \quad (12)$$

$$\text{Sensitivity coefficient} = \text{function (distance to destination, speed, acceleration, gradient of acceleration, node-to-node link width, node-to-node link information)} \quad (13)$$

$$\text{Sensitivity coefficient} = \text{Function (distance to destination, speed, acceleration, gradient of acceleration, node-to-node link width, node-to-node link speed)} \quad (14)$$

$$\text{Sensitivity coefficient} = \text{Function (distance to destination, speed, acceleration, gradient of acceleration, node-to-node link number, node-to-node link information)} \quad (15)$$

Sensitivity coefficient=Function (distance to destination, speed, acceleration, gradient of acceleration, node-to-node link number, node-to-node link speed) (16)

Sensitivity coefficient=Function (distance to destination, speed, acceleration, gradient of acceleration, node-to-node link information, node-to-node link speed) (17)

Sensitivity coefficient=Function (distance to destination, speed, acceleration, gradient of acceleration, node-to-node link width, node-to-node link number, node-to-node link information) (18)

Sensitivity coefficient=Function (distance to destination, speed, acceleration, gradient of acceleration, node-to-node link width, node-to-node link number, node-to-node link speed) (19)

Sensitivity coefficient Function (distance to destination, speed, acceleration, gradient of acceleration, node-to-node link width, node-to-node link information, node-to-node link speed) (20)

Sensitivity coefficient=Function (distance to destination, speed, acceleration, gradient of acceleration, node-to-node link number, node-to-node link information, node-to-node link speed) (21)

Sensitivity coefficient=Function (distance to destination, speed, acceleration, gradient of acceleration, node-to-node link width, node-to-node link number, node-to-node link information, speed on link between nodes) (22)

If the sensitivity coefficient is determined by any one of the equations (8) to (22), then the human sensitivity model D14 may be connected directly to the map information DB 11. In this case, the human sensitivity model D14 obtains the information from the map information DB 11.

The function determined by any one of the equations (8) to (22) shows a linear value or a value obtained beforehand by learning the neutral net.

In the neutral net, a biogenic signal indicating uncomfortable is determined by any experiments, so that the function is introduced. The detail of the neutral net is disclosed by a reference 5:

(Reference 5)

Yukio Kuriyagawa, Ichirou Kageyama "Ningen, jidousya, kankyoukei niokeru seishinfutankyoukamoderu nikansuru kenkyuu (Study structure of mental load evaluation model in humans, automobile and environment system)", report of college of industrial technology, Nihon university, June, 2003, No. 36-1

Moreover, it is preferable that the node-to-node link speed is set to a lower value than a speed limit on a road, if the node-to-node link width is narrow.

The sensitivity coefficient, which is determined by the equation (1) or any one of the equations (8) to (22), may be changed depending on the health condition of a driver. In this case, a health condition measurement system needs to be provided in a vehicle, and the sensitivity coefficient may be classified into several stages according to the result of the measurement. This detailed example is disclosed in Japanese Unexamined Patent Application Publications 2005-211229 and 7-96767.

For example, the health condition measurement system measures the condition of a driver in four stages "excellent", "good", "poor" and "bad". In this case, a constant is preset to 1.2, 1.0, 0.7 and 0.4, respectively. The health condition measurement system sends this coefficient to the human sensitivity model DB 14. Then, the sensitivity coefficient table multiplies the sensitivity coefficient by the received coefficient, thereby providing the sensitivity coefficient.

The speed control section 16 can receive information directly from the human sensitivity model DB 14. In this case, the distance from a current location to a destination in the sensitivity coefficient table may be replaced by the following distance determined from the radar camera 9 (FIG. 5) or the target following distance outputted from the target following distance generator 16-1. Likewise, the human sensitivity model DB 14 may receive information directly from the map information DB 11. In this case, the groups of the area attribute may be replaced by the node-to-node link width, node-to-node link number, or node-to-node link speed.

As for the area attribute information of the map information DB 11, if the nodes within a control-executed zone exceed the majority of all the nodes, then nodes in areas other than the controlled area may be used. Otherwise, the nodes in the controlled area may be used.

The vehicle speed control device can be implemented with not only a dedicated hardware but software by which the above functions can be executed. The software may be recorded in a computer-readable recording medium, such as a flexible disk, hard disk, optical disc or volatile memory.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A vehicle speed control device including a speed control section, the vehicle speed control device for controlling a speed of a vehicle within a control-executed zone by computing a target speed of the vehicle based on map information and a current location of the vehicle and by supplying the target speed to the speed control section, the vehicle speed control device comprising:

a current location error estimation section for extracting area attribute information from the map information, for producing a location error probability distribution of the vehicle based on the area attribute information, and for outputting the produced location error probability distribution as a target speed correction instruction, wherein the area attribute information indicates an attribute of the current location or of the control-executed zone;

a human sensitivity model memory section for storing preset data comprising an acceleration or a gradient of an acceleration which is predetermined based on a distance between a destination and a speed change start point of a target speed;

a target speed calculation section for receiving the target speed correction instruction from the current location error estimation section, accessing the preset data stored in the human sensitivity model section, computing target speed values at nodes over the distance in such a way that the target speed values create a continuous curve, calculating a target speed error based on the location error probability distribution, and updating the target speed values in the continuous curve based on the target speed error; and a speed control section for sensing a speed of a vehicle, and for controlling a driving torque of the vehicle so that the sensed speed traces the continuous curve composed of the target speed values.

2. The vehicle speed control device according to claim 1, wherein the human sensitivity model memory section stores at least one of a node-to-node link distance, a node-to-node link width, a node-to-node link number, node-to-node link information, and node-to-node link speed, and wherein the node-to-node link distance indicates a distance between adjacent ones of nodes, the node-to-node link width indicates a width of a road, the node-to-node link number indicates the number of lanes on the road, a node-to-node link information indicates a direction in which the vehicle is to turn at the nodes to which the node-to-node link number is allocated, and the node-to-node link speed indicates a speed limit of a link between adjacent ones of the nodes.

3. The vehicle speed control device according to claim 1, further comprising a user interface section for informing an external that the speed control section cannot execute a control operation, if the current location of the vehicle is not acquired.

4. The vehicle speed control device according to claim 1, wherein the current location error estimation section, comprises:

a fixed measurement point location error probability distribution memory section for containing location error probability distributions corresponding to fixed measurement point nodes;

a location error probability distribution acquisition section for acquiring the location error probability distributions from the fixed measurement point location error probability distribution memory section;

a map information acquisition section for acquiring the area attribute information on at least two of the fixed measurement point nodes around the current location or on the control-executed zone; and an error probability distribution interpolation pattern memory section for containing area transit interpolation patterns depending on the area attribute information at adjacent ones of the nodes; and an error probability distribution interpolation section for correcting the location error probability distributions by using the area transit interpolation patterns and for outputting the corrected location error probability distributions.

5. The vehicle speed control device according to claim 4, wherein the current location error estimation section, further comprises:

a vehicle information error probability distribution correction section for computing probability distributions representing an magnitude of a possible error which one or more sensors installed on the vehicle occurs at the nodes, for determining new error probability distributions produced by multiplying the probability distributions at the nodes by the location error probability distributions at the corresponding nodes; and for outputting the new error probability distributions to the target speed calculation section as the target speed correction instructions.

6. The vehicle speed control device according to claim 1, wherein the target speed calculation section comprises:

a function computing section for creating a target speed curve by computing target speed values at the individual nodes between the current location and the destination, on the condition that an error is ignored;

an allowable error speed determining section for, upon reception of the target speed correction instructions from the current location error estimation section, computing an allowable error speed, based on a difference between a target speed value on the target speed curve at an allowable error point and a target speed value at the destination, wherein the allowable error speed covers accuracy requirement of the speed control section;

a response curve generating section for receiving the location error probability distributions at the nodes from the current location error estimation section, for entering the received location error probability distributions into a vehicle speed control system, for creating a response target speed curve having an amplitude between the current location and the destination, and for outputting the created curve, wherein the vehicle speed control system, which is adapted to receive the current location and to output the target speed, varies the speed of the vehicle based on the target speed, senses the variation in the current location with time passing, and feedbacks the variation to the current location;

a target speed error range update section for converting a difference between errors on a near side and a far side with respect to the current location based on the location error probability distribution into speed error ranges using a predetermined equation, and for updating the target speed error ranges at the nodes by using values of the target speed error range if the target speed error range falls within the speed error range, or by using a maximum or minimum value of the target speed error range if the target speed error range falls outside the speed error range;

a new target speed value curve generating section for creating a new target speed curve that passes through an extremal value on the target speed error range on the near side and that has a speed change start point being sifted from that of the target speed curve on the near side; and a new target speed output section for accessing the human sensitivity model memory section, for correcting one or more values on the new target speed curve such that an acceleration or a gradient of the acceleration in the updated target speed curve is smaller than a predetermined value stored in the human sensitivity model memory section, and for outputting the corrected new target speed curve to the speed control section.

7. The vehicle speed control device according to claim 6, wherein the target speed calculation section further comprises target speed value curve learning memory section for memorizing the new target speed curve for the route whenever the vehicle runs on a route, and for outputting the target speed curve to the speed control section when the vehicle approaches the route.

8. A method of setting a target speed by using a vehicle speed control device, the vehicle speed control device including a memory unit and a computing unit, for controlling a speed of a vehicle within a control-executed zone by computing a target speed of the vehicle based on map information and a current location of the vehicle and by supplying the target speed to a speed control section, the method comprising:

producing a location error probability distribution of the vehicle by using the computing unit, based on area attribute information contained in the map information, wherein the area attribute information indicates an attribute of the current location or of the control-executed zone;

outputting the location error probability distribution;

providing a human sensitivity model memory section for storing preset data comprising an acceleration or a gradient of an acceleration which is predetermined based on a distance between a destination and a speed change start point of a target speed;

reading the location error probability distribution and the preset data;

computing target speed values at nodes over the distance by using the computing unit in such a way that the target speed values create a continuous curve;

calculating a target speed error based on the location error probability distribution; and updating the target speed values in the continuous curve based on the target speed error.

9. The method according to claim 8, wherein the production of the location error probability distribution of the vehicle comprises:

accessing a fixed measurement location error probability distribution DB contained in the memory unit and corresponding to the fixed measurement point nodes;

acquiring the location error probability distribution from the fixed measurement location error probability distribution DB;

extracting, from the map information contained in the memory unit, the area attribute information between at least two of the fixed measurement point nodes around the current location;

computing an error of the current location of the vehicle by correcting the location error probability distributions by using area transit interpolation patterns being determined by the area attribute information;

computing probability distributions representing a magnitude of a possible error which one or more sensors installed on the vehicle occurs at the nodes between the current location and the determination, determining new error probability distributions produced by multiplying the probability distributions at the nodes by the location error probability distributions at the corresponding nodes; and outputting the new error probability distributions as the target speed correction instructions.

10. The method according to claim 8, wherein the computation of the target speed values at the nodes comprises:

creating a target speed curve by computing target speed values at the individual nodes between the current location and the destination, on the condition that an error is ignored;

upon reception of the target speed correction instructions, computing an allowable error speed, based on a difference between a target speed value on the target speed curve at an allowable error point and a target speed value at the destination, wherein the allowable error speed covers accuracy requirement of the speed control section;

receiving the location error probability distributions at the nodes from the current location error estimation section, entering the received location error probability distributions into a vehicle speed control system, creating a response target speed curve having an amplitude between the current location and the destination, and for outputting the created curve, wherein the vehicle speed control system, which is adapted to receive the current location and to output the target speed, varies the speed of the vehicle based on the target speed, senses the variation in the current location with time passing, and feedbacks the variation to the current location;

converting a difference between errors on a near side and a far side with respect to the current location based on the location error probability distribution into speed error ranges using a predetermined equation, updating the target speed error ranges at the nodes by using values of the target speed error range if the target speed error range falls within the speed error range, or by using a maximum or minimum value of the target speed error range if the target speed error range falls outside the speed error range;

creating a new target speed curve that passes through an extremal value on the target speed error range on the near side and that has a speed change start point being sifted from that of the target speed curve on the near side;

accessing the preset data stored in the human sensitivity model memory section;

correcting one or more values on the new target speed curve such that an acceleration or a gradient of the acceleration in the updated target speed curve is smaller than a predetermined value stored in the human sensitivity model memory section, and outputting the corrected new target speed curve to the speed control section.

* * * * *